US012502321B2

(12) United States Patent

Rigsby et al.

(10) Patent No.: US 12,502,321 B2
(45) Date of Patent: Dec. 23, 2025

(54) BELT DRIVEN WIDTH EXPANSION OF A BED

(71) Applicant: Hill-Rom Services, Inc., Batesville, IN (US)

(72) Inventors: Mark Tyler Rigsby, Dayton, OH (US); Brian Guthrie, Greensburg, IN (US); Stephen E. Hutchison, Batesville, IN (US); Frank Lewis, Fairfield, OH (US); David P. Lubbers, Cincinnati, OH (US); Christian H. Reinke, York, SC (US); Mahesh Kumar Thodupunuri, Fishers, IN (US)

(73) Assignee: Hill-Rom Services, Inc., Batesville, IN (US)

(*) Notice: Subject to any disclaimer, the term of this patent is extended or adjusted under 35 U.S.C. 154(b) by 280 days.

(21) Appl. No.: 17/830,679

(22) Filed: Jun. 2, 2022

(65) Prior Publication Data

US 2022/0287895 A1 Sep. 15, 2022

Related U.S. Application Data

(63) Continuation of application No. 16/798,626, filed on Feb. 24, 2020, now Pat. No. 11,376,177, which is a (Continued)

(51) Int. Cl.
*A61G 7/018* (2006.01)
*A61G 7/002* (2006.01)
(Continued)

(52) U.S. Cl.
CPC ............. *A61G 7/018* (2013.01); *A61G 7/002* (2013.01); *A61G 7/015* (2013.01); *A61G 7/05* (2013.01); *A61G 7/0513* (2016.11); *A61G 7/0524* (2016.11); *A61G 7/012* (2013.01); *A61G 7/0755* (2013.01); *A61G 2200/16* (2013.01);
(Continued)

(58) Field of Classification Search
CPC ........ A61G 7/018; A61G 7/002; A61G 7/015; A61G 7/05; A61G 7/0513; A61G 7/0524; A61G 7/012; A61G 7/0755; A61G 2200/16; A61G 2203/12; A61G 2203/20; A47C 19/04; Y10T 403/45; Y10T 403/453; Y10T 403/54
See application file for complete search history.

(56) References Cited

U.S. PATENT DOCUMENTS 117,659 A * 8/1871 McKnight ................ A47B 1/02 108/87
327,829 A * 10/1885 Simpson .............. A61G 7/0507 5/17
(Continued)

FOREIGN PATENT DOCUMENTS

EP 1 020 146 7/2000
EP 1 296 580 4/2003
(Continued)

*Primary Examiner* — Matthew Troutman
*Assistant Examiner* — Morgan J McClure
(74) *Attorney, Agent, or Firm* — Barnes & Thornburg LLP

(57) ABSTRACT

A bed comprises a fixed width deck section, a wing movably coupled to the fixed width section, and a mechanism for extending and retracting the wing.

20 Claims, 40 Drawing Sheets

Related U.S. Application Data continuation of application No. 15/681,590, filed on Aug. 21, 2017, now Pat. No. 10,603,233, which is a continuation of application No. 14/887,708, filed on Oct. 20, 2015, now Pat. No. 9,763,840, which is a continuation of application No. 14/168,538, filed on Jan. 30, 2014, now Pat. No. 9,173,796.

(60) Provisional application No. 61/788,210, filed on Mar. 15, 2013, provisional application No. 61/763,470, filed on Feb. 11, 2013, provisional application No. 61/760,881, filed on Feb. 5, 2013.

(51) Int. Cl.

*A61G 7/012* (2006.01)
*A61G 7/015* (2006.01)
*A61G 7/05* (2006.01)
*A61G 7/075* (2006.01)

(52) U.S. Cl.

CPC ...... *A61G 2203/12* (2013.01); *A61G 2203/20* (2013.01); *Y10T 403/45* (2015.01); *Y10T 403/453* (2015.01); *Y10T 403/54* (2015.01)

(56) References Cited

U.S. PATENT DOCUMENTS 692,140 A * 1/1902 Hutchison et al. .... A47C 17/32 5/18.1
847,450 A 3/1907 Williams
1,821,404 A 9/1931 Rapelin
RE19,272 E * 8/1934 Kurkchee .............. A47C 19/04 5/183
2,306,031 A * 12/1942 Anderson .......... A61G 13/0009 5/624
2,373,590 A * 4/1945 Nelson ................... A61G 7/012 5/84.1
2,397,092 A * 3/1946 Drexler .................. A61G 7/015 5/616
2,438,236 A 3/1948 Strom
2,481,965 A 9/1949 Woller
2,566,800 A * 9/1951 Hutcherson ............ A47B 11/00 108/65
2,592,166 A * 4/1952 McLean ................. A61G 7/012 5/11
2,605,481 A * 8/1952 Burkhart ................ A47C 20/08 5/616
2,666,216 A * 1/1954 Schnaitter ............ A47C 20/043 5/660
3,081,463 A * 3/1963 Williams ............... A61G 7/051 5/430
3,220,021 A 11/1965 Nelson
3,220,022 A 11/1965 Nelson
3,413,663 A 12/1968 Swann
3,414,913 A * 12/1968 Stanley .................. A61G 7/002 5/616
3,581,319 A * 6/1971 Stanley et al. ......... A61G 7/002 5/616
3,669,440 A * 6/1972 Kartasuk ................. B25B 1/125 74/89.32
3,681,792 A * 8/1972 Korber ................. A47C 20/041 5/154
3,710,404 A * 1/1973 Peterson ................ A61G 5/006 5/616
3,802,002 A * 4/1974 Jonas ..................... A61G 7/005 5/616
3,893,197 A 7/1975 Ricke
4,183,015 A 1/1980 Drew et al.
4,409,695 A 10/1983 Johnston et al.
4,559,655 A * 12/1985 Peck ...................... A61G 7/015 5/616
4,669,136 A 6/1987 Waters et al.
4,680,790 A 7/1987 Packard et al.
4,700,417 A 10/1987 McGovern
4,718,355 A * 1/1988 Houghton ................ A47B 9/16 108/147
4,803,744 A 2/1989 Peck et al.
4,805,249 A * 2/1989 Usman ..................... A61G 7/00 5/604
4,847,929 A 7/1989 Pupovic
4,985,946 A 1/1991 Foster et al.
5,023,967 A 6/1991 Ferrand
5,077,843 A 1/1992 Foster et al.
5,083,332 A 1/1992 Foster et al.
5,165,129 A * 11/1992 Rohm .................... A61G 7/015 5/616
5,179,744 A 1/1993 Foster et al.
5,329,657 A * 7/1994 Bartley ................ A47C 20/041 5/616
5,345,629 A 9/1994 Ferrand
5,377,370 A 1/1995 Foster et al.
5,392,475 A * 2/1995 McCall .................. A47C 23/06 5/18.1
5,392,476 A * 2/1995 Williams .................. A45F 3/24 5/127
5,392,479 A * 2/1995 Liao ..................... A61G 7/0573 5/942
5,444,880 A * 8/1995 Weismiller ............. A61G 7/015 5/616
5,479,666 A 1/1996 Foster et al.
5,542,136 A 8/1996 Tappel
5,542,138 A 8/1996 Williams et al.
5,592,153 A 1/1997 Welling et al.
5,628,078 A 5/1997 Pennington et al.
5,630,238 A 5/1997 Weismiller et al.
5,682,631 A 11/1997 Weismiller et al.
5,745,936 A 5/1998 Van McCutchen et al.
5,771,511 A 6/1998 Kummer et al.
5,878,452 A 3/1999 Brooke et al.
6,000,076 A * 12/1999 Webster ................... A61G 7/05 5/616
6,008,598 A 12/1999 Luff et al.
6,131,868 A 10/2000 Welling et al.
6,182,310 B1 2/2001 Weismiller et al.
6,185,767 B1 2/2001 Brooke et al.
6,226,816 B1 5/2001 Webster et al.
6,230,346 B1 * 5/2001 Branson ................. A61G 7/015 5/616
6,279,183 B1 8/2001 Kummer et al.
6,320,510 B2 11/2001 Menkedick et al.
6,324,709 B1 12/2001 Ikeda et al.
6,357,065 B1 * 3/2002 Adams ................... A61G 7/005 5/617
6,362,725 B1 3/2002 Ulrich et al.
6,396,224 B1 5/2002 Luff et al.
6,486,792 B1 11/2002 Moster et al.
6,526,609 B2 3/2003 Wong
6,658,680 B2 12/2003 Osborne et al.
6,675,415 B2 1/2004 Wong
6,678,908 B2 1/2004 Borders et al.
6,874,179 B2 4/2005 Hensley et al.
6,880,189 B2 4/2005 Welling et al.
7,055,195 B2 6/2006 Roussy
7,210,180 B2 5/2007 Malcolm
7,363,663 B2 4/2008 Chambers et al.
7,406,729 B2 * 8/2008 Hornbach ................ A61G 7/05 5/613
7,461,425 B2 12/2008 Chambers et al.
7,464,425 B2 * 12/2008 Chambers .......... A61G 7/05776 5/739
7,469,433 B2 * 12/2008 Ruehl .................... A61G 13/10 5/617
7,568,247 B2 8/2009 Strobel et al.
7,712,168 B2 * 5/2010 Kim ....................... A61G 7/053 5/942
7,730,562 B2 6/2010 Hornbach
7,743,441 B2 * 6/2010 Poulos ................... A61G 7/005 5/613
7,810,282 B2 10/2010 Oxley
7,845,034 B2 * 12/2010 Kim ......................... A61G 7/16 5/942

(56) References Cited

U.S. PATENT DOCUMENTS 7,926,131 B2 4/2011 Menkedick et al.
7,962,981 B2 * 6/2011 Lemire .................. B60T 17/22 5/616
8,056,163 B2 11/2011 Lemire et al.
8,104,122 B2 * 1/2012 Richards .............. A61G 7/0507 5/613
8,113,076 B2 2/2012 Daul
8,344,860 B2 * 1/2013 Collins, Jr. .......... G08B 25/005 340/286.07
8,402,854 B2 * 3/2013 Yamaguchi ............. F16H 25/20 74/99 R
8,418,291 B2 * 4/2013 Hornbach ............ A61G 7/0514 5/616
8,621,690 B2 * 1/2014 Hornbach ............ A61G 7/0528 5/613
8,635,727 B2 * 1/2014 Dahlin ............... B62D 33/0612 5/18.1
8,650,686 B2 * 2/2014 Biggie ............... A61G 7/05776 5/713
8,719,980 B2 * 5/2014 Chen ...................... A61H 7/004 5/934
8,800,080 B2 * 8/2014 Kay ....................... A61G 7/018 5/616
8,997,282 B2 4/2015 Bossingham et al.
9,009,888 B1 * 4/2015 Tekulve ................. A61G 7/015 5/202
9,173,796 B2 11/2015 Rigsby et al.
9,622,927 B1 * 4/2017 Edgerton ............... A61G 7/002
9,655,798 B2 * 5/2017 Zerhusen ............... A61G 7/015
9,763,840 B2 9/2017 Rigsby et al.
10,603,233 B2 3/2020 Rigsby et al.
11,096,861 B2 * 8/2021 Lurie ................... A61G 13/122
11,376,177 B2 7/2022 Rigsby et al.
2001/0032362 A1 10/2001 Welling et al.
2001/0044971 A1 11/2001 Borders et al.
2001/0047546 A1 * 12/2001 Megown ................ A61G 7/012 5/611
2002/0059679 A1 5/2002 Weismiller et al.
2004/0148704 A1 * 8/2004 Tekulve ................. A61G 7/015 5/618
2004/0221386 A1 * 11/2004 Loewenthal ........... A61G 7/012 5/11
2005/0081295 A1 * 4/2005 Malcolm .............. A61G 13/125 5/624
2005/0172405 A1 8/2005 Menkedick
2006/0021142 A1 2/2006 Hornbach et al.
2006/0026762 A1 2/2006 Hornbach et al.
2006/0026767 A1 * 2/2006 Chambers ............ A61G 7/0514 5/713
2006/0059623 A1 * 3/2006 Karmer, Jr. ............ A61G 7/018 5/616
2006/0117479 A1 * 6/2006 Kawakami ............. A61G 7/015 5/411
2006/0195984 A1 * 9/2006 HakamiuN .......... A61G 7/0514 5/430
2007/0296600 A1 * 12/2007 Dixon .................. A61G 7/0509 340/540
2008/0000028 A1 * 1/2008 Lemire .................. A61G 7/053 5/722
2008/0040857 A1 2/2008 Karmer et al.
2008/0168602 A1 7/2008 DiForio
2008/0282472 A1 11/2008 Hornbach et al.
2009/0293197 A1 * 12/2009 Larson ................... A61G 7/002 5/613
2010/0005592 A1 * 1/2010 Poulos ................. A61G 7/0509 5/613
2013/0145550 A1 * 6/2013 Roussy .................. A61G 7/012 74/25
2013/0227787 A1 * 9/2013 Herbst ................. A61G 7/1067 5/618
2013/0232690 A1 9/2013 Hornbach et al.
2013/0298331 A1 * 11/2013 Bossingham .......... A61G 7/018 5/613
2014/0026325 A1 * 1/2014 Guthrie .............. A61G 7/05776 5/709
2014/0033435 A1 * 2/2014 Jutras ................... A47C 19/045 5/611
2014/0047641 A1 * 2/2014 Thodupunuri ....... A61G 7/0514 5/613
2014/0215717 A1 * 8/2014 Rigsby ................. A61G 7/0513 5/613
2014/0259413 A1 * 9/2014 Johnson ................... A61G 7/08 5/613
2014/0352068 A1 * 12/2014 Xu ......................... A61G 7/015 5/616
2015/0128347 A1 * 5/2015 Hutchison ............. A61G 7/018 5/616
2016/0038360 A1 2/2016 Rigsby et al.
2017/0340497 A1 11/2017 Rigsby et al.
2020/0188203 A1 6/2020 Rigsby et al.

FOREIGN PATENT DOCUMENTS

GB 2313303 11/1997
JP 2004-073387 3/2004
WO WO 99/15126 4/1999
WO WO 2003/053322 7/2003

* cited by examiner

BELT DRIVEN WIDTH EXPANSION OF A BED

This application is a continuation of U.S. application Ser. No. 16/798,626, filed Feb. 24, 2020, now U.S. Pat. No. 11,376,177, which is a continuation of U.S. application Ser. No. 15/681,590, filed Aug. 21, 2017, now U.S. Pat. No. 10,603,233, which is a continuation of U.S. application Ser. No. 14/887,708, filed Oct. 20, 2015, now U.S. Pat. No. 9,763,840, which is a continuation of U.S. application Ser. No. 14/168,538, filed Jan. 30, 2014, now U.S. Pat. No. 9,173,796, which claims the benefit, under 35 U.S.C. § 119 (e), of U.S. Provisional Application Nos. 61/760,881, filed Feb. 5, 2013; 61/763,470, filed Feb. 11, 2013; and 61/788,210 filed Mar. 15, 2013, each of which is hereby incorporated by reference herein.

TECHNICAL FIELD

The subject matter described herein relates to beds of the type used in hospitals, other health care facilities and home health care settings, in particular a bed having at least one powered width expansion wing.

BACKGROUND

Beds used in hospitals, other health care facilities and home health care settings include a deck and a mattress supported by the deck. Some beds have a fixed width deck. Other beds include a fixed width center deck section, a left width adjustment wing and a right width adjustment wing. The wings can be stored under the fixed width center section, in which case the deck width equals the width of the fixed width section. The wings can also be stored partially under the fixed width center section so that they each project laterally beyond the lateral edges of the center section by a distance D1, in which case the deck width equals the width of the fixed width section plus two times the distance D1. The wings can also be deployed so that they each project laterally beyond the lateral edges of the fixed width section by a distance D2, which is greater than D1, in which case the deck width equals the width of the fixed width section plus two times the distance D2. With the wings deployed, the bed may be outfitted with a bariatric mattress, which is wider than a nonbariatric mattress, to accommodate a bariatric occupant. A typical bariatric mattress has a center section, a left width augmentation section and a right width augmentation section. Examples of augmentation sections include air filled bladders and foam inserts. The width adjustment wings are useful because with the wings deployed in order to accommodate a bariatric occupant the bed is too wide to fit through a typical doorway. When it becomes necessary to transport the occupant to a different location without removing him or her from the bed, the wings can be temporarily moved to their stored position and the mattress can be temporarily reduced in width, for example by deflating the augmentation bladders or laterally compressing the augmentation foam, so that the bed is able to fit through the doorways. Upon reaching the intended destination the bed can then be restored to its bariatric configuration, i.e. with the wings deployed and the mattress re-expanded to its bariatric width.

In a typical width adjustable bed the stored position of the wings is underneath the fixed width deck section. A caregiver deploys the wings by manually pulling them laterally away from the longitudinal centerline of the bed, and stores them by manually pushing them laterally toward the centerline. U.S. Pat. No. 7,730,562 describes a bed having powered width expansion wings. The only specific means disclosed for powering the wings are a hydraulic cylinder or a linear actuator. Such actuation devices can suffer from disadvantages such as bulk, weight and cost. Accordingly, it is desirable to devise more compact, lightweight, low cost systems for powering the expansion wings without sacrificing simplicity and reliability. It is also desirable if such systems can be retrofit onto existing beds having manually operated wings. It is also desirable if such systems or their components can be economically and easily repaired or replaced when necessary.

SUMMARY

A bed disclosed herein comprises a fixed width section having a width and an outboard edge, a wing movably coupled to the fixed width section, a motor assembly mechanically grounded to one of the fixed width section and the wing, and a lead screw coupled to the motor assembly and to a lead screw receiver nonmovably associated with the other of the fixed width section and the wing. In practice, operation of the motor is capable of moving the wing between a deployed position in which a lateral extremity thereof is outboard of the outboard edge and a stored position in which the lateral extremity is inboard of its deployed position.

A retrofit kit as disclosed herein for upgrading a host bed having manually operable width extension wings comprises a motor assembly, a bracket for mounting the motor assembly to a bed frame, a lead screw set comprising oppositely handed lead screws each attachable to the motor assembly, and a lead screw support bracket set. Each member of the support bracket set is securable to a width extension wing of the host bed. The members of the support bracket set have oppositely handed lead screw receivers.

BRIEF DESCRIPTION OF THE DRAWINGS

The foregoing and other features of the various embodiments of the width adjustable bed and retrofit kit described herein will become more apparent from the following detailed description and the accompanying drawings in which.

DETAILED DESCRIPTION

Figure 1:
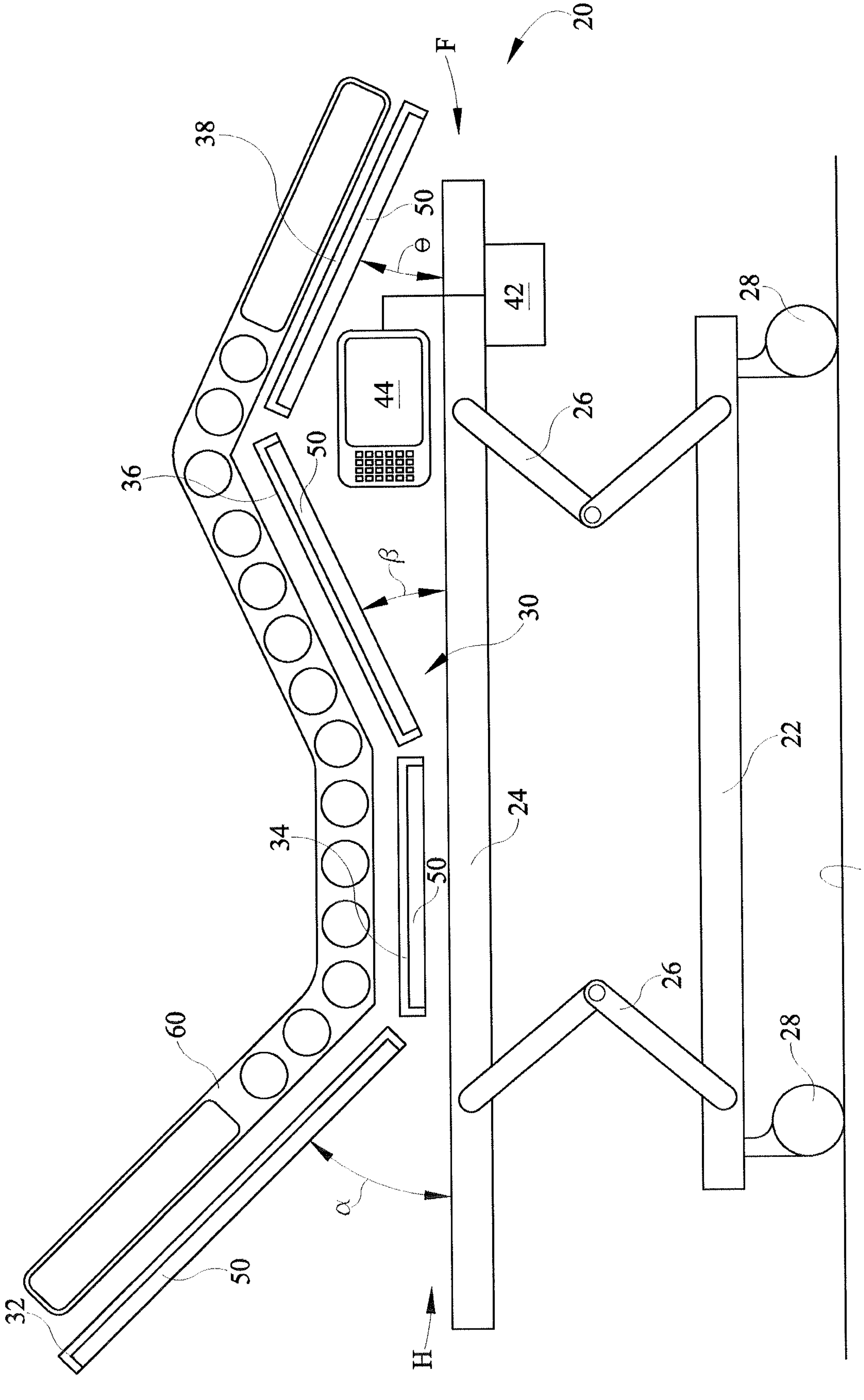
FIG. 1 is a simplified schematic right side elevation view of a hospital bed.
Figure 2:
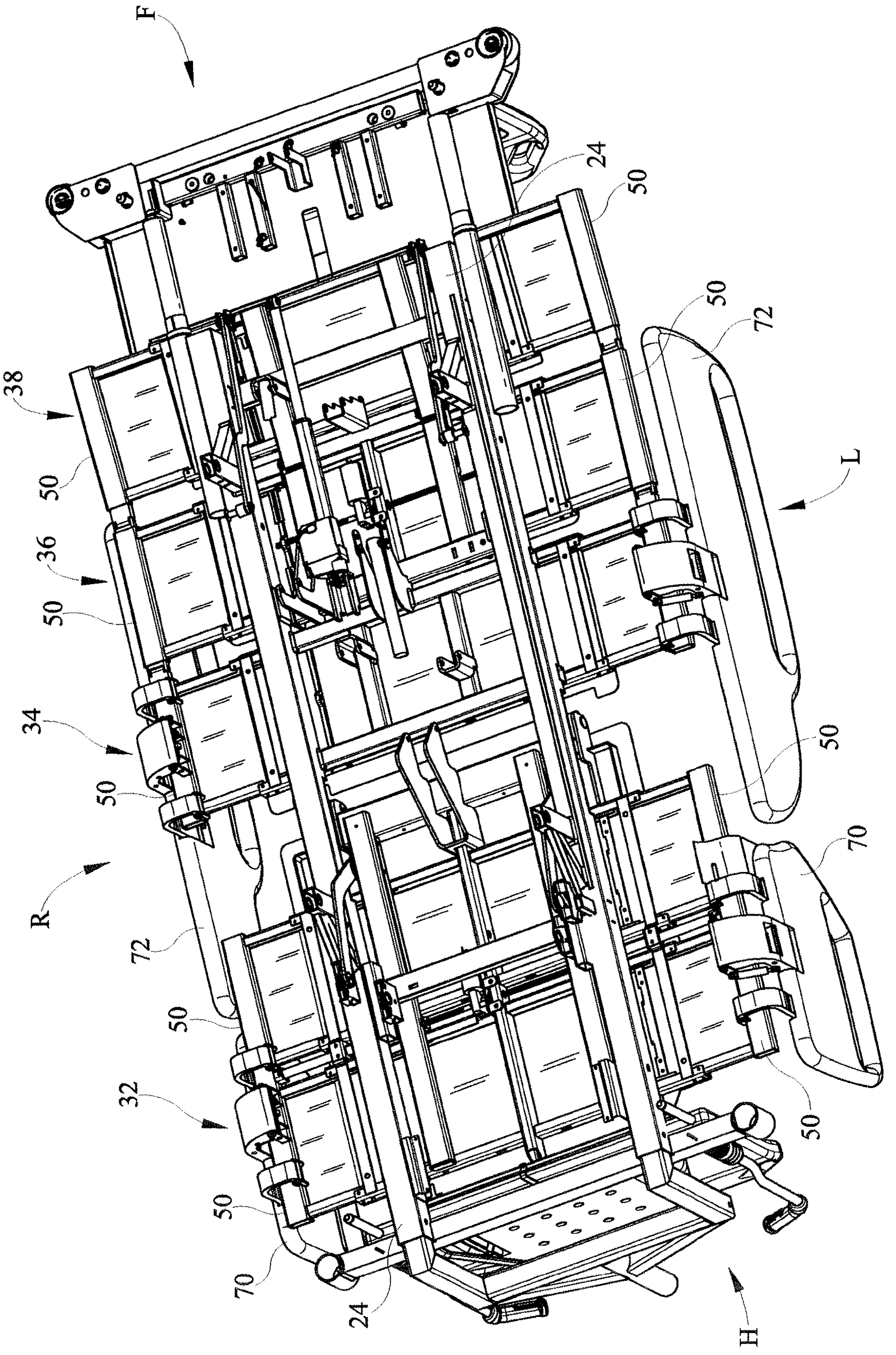
FIG. 2 is a perspective view of a hospital bed deck having a fixed width center deck section, a left width adjustment wing and a right width adjustment wing as seen by an observer looking from beneath the deck.

Referring to FIGS. 1 and 2 a hospital bed 20 includes a base frame 22 and an elevatable frame 24. A lift system represented by links 26 renders the elevatable frame vertically moveable relative to the base frame. The bed extends longitudinally from a head end H to a foot end F and laterally from a right side R (seen in the plane of the illustration) to a left side L. Casters 28 extend from the base frame to floor 40. The elevatable frame 24 includes a deck 30 comprising longitudinally distributed deck segments. The deck segments include an upper body or torso deck segment 32 corresponding approximately to an occupant's torso, a seat deck segment 34 corresponding approximately to an occupant's buttocks, a thigh deck segment 36 corresponding approximately to an occupant's thighs, and a calf deck segment 38 corresponding approximately to an occupant's calves. The upper body, calf, and thigh deck segments are orientation adjustable through angles $\alpha$, $\beta$ and $\Theta$. The bed also includes a controller 42 for controlling various functions of the bed and a user interface 44 in communication with the controller.

Deck segments 32, 34, 36, 38 are width adjustable segments that include wings 50 movably coupled to a fixed width center section 52. The fixed width center section has a width WF measured between left and right outboard edges 54, 56. In the illustration all four segments are width adjustable segments with both left and right wings. Alternatively, one or more wings could be coupled to only one side (left or right) of the bed. The illustrated bed has ten wings, two of which (one left and one right) are coupled to each of the seat, thigh and calf segments and four of which (two left and two right) are coupled to the upper body segment. A mattress 60 rests on the deck.

Figure 3:
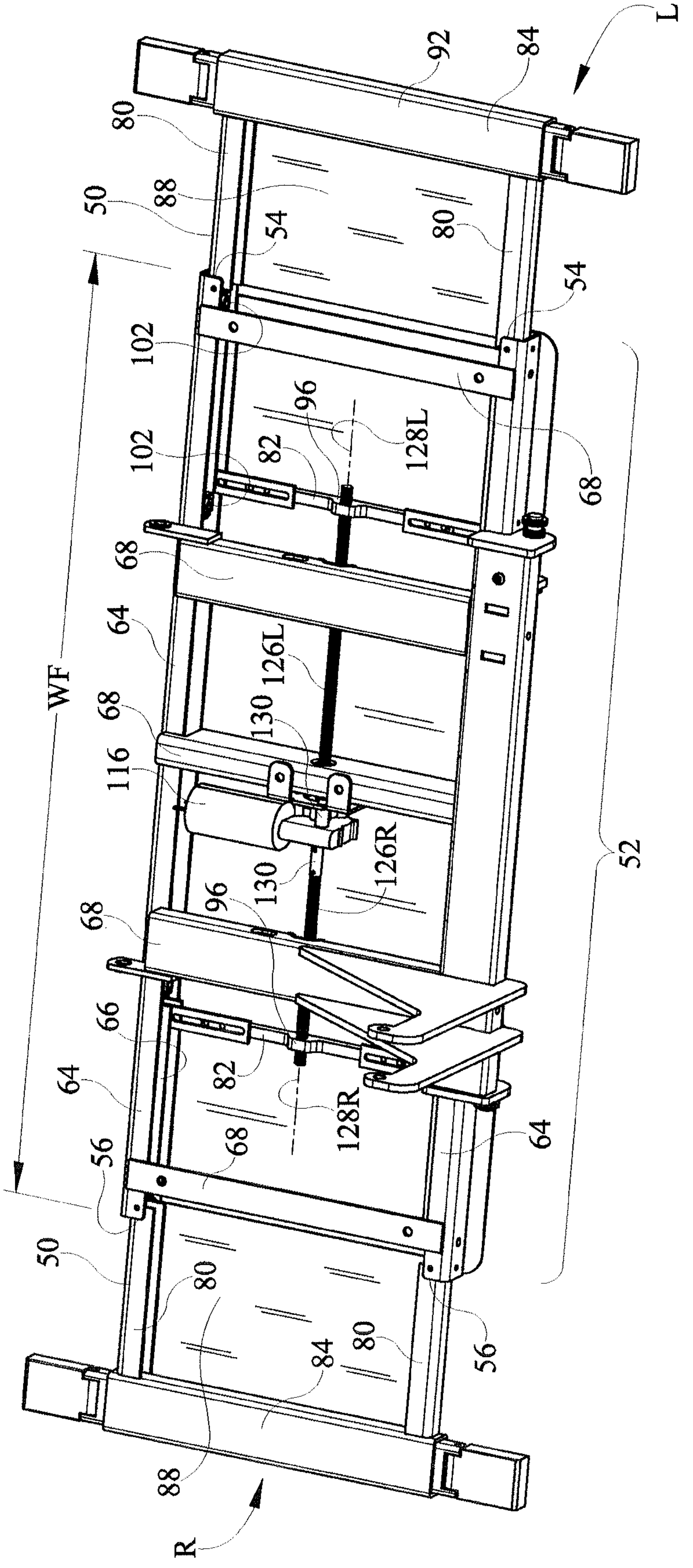
FIG. 3 is a view of a typical deck segment, specifically a thigh deck segment, as seen by an observer looking from beneath the segment.
Figure 4:
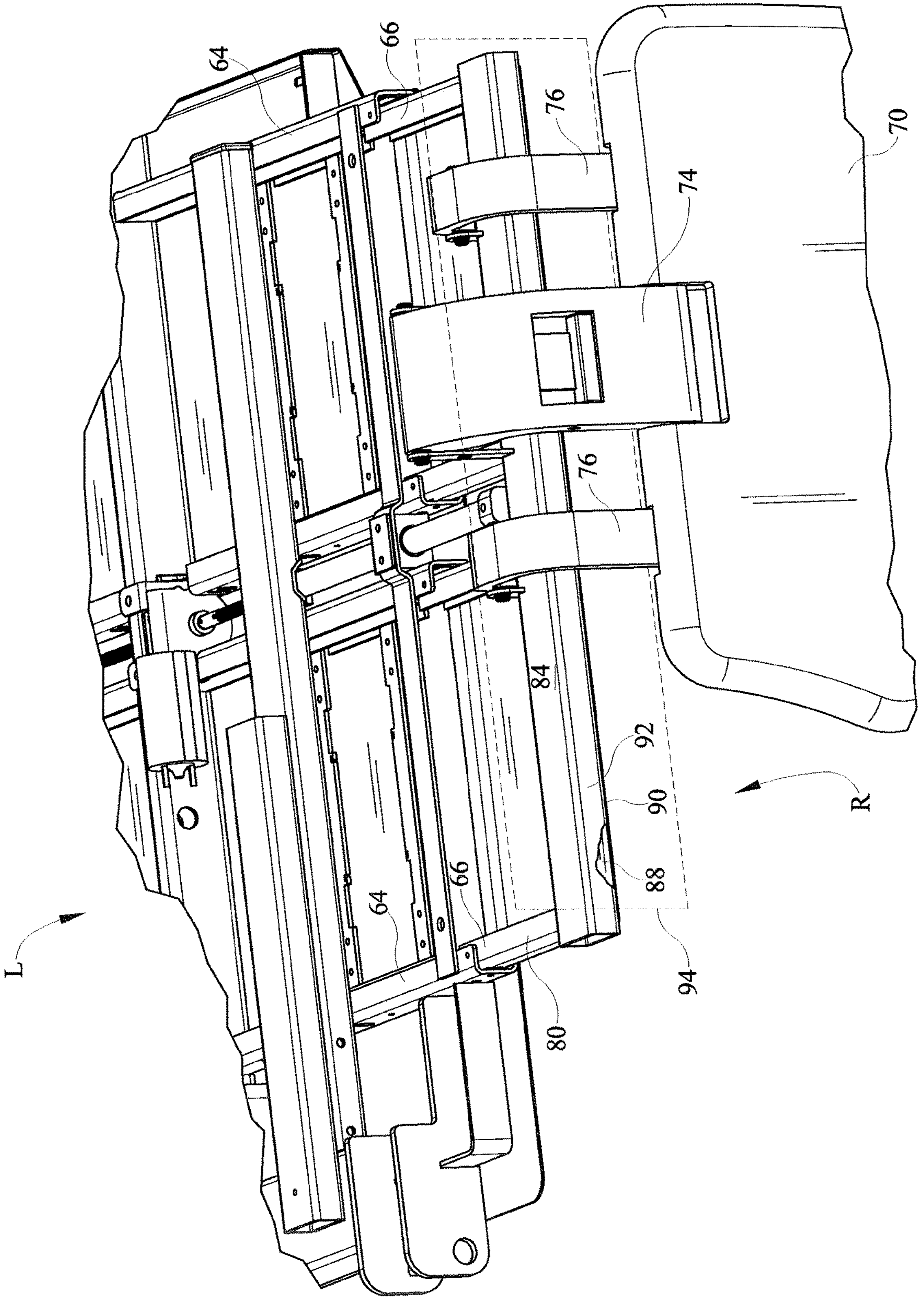
FIG. 4 is a perspective view showing the right outboard portion of a typical deck segment, specifically an upper body deck segment, as seen by an observer looking from beneath the segment.

As seen in FIG. 3, a typical deck segment includes a pair of longitudinally spaced apart crossbars 64, connected together by longitudinally extending rails 68. The illustrated crossbars are in the form of C-channels having open sides 66 (seen best in FIG. 4) that face toward each other.

The bed also includes left and right head end siderails 70, and left and right foot end siderails 72. As seen most clearly in FIG. 4, each siderail is connected to a wing 50 by a center link 74 and a longitudinally split link 76 such that the siderail 70 or 72, wing 50 and links 74, 76 comprise a four bar linkage which enables a user to vertically raise and lower the siderail.

Figure 6:
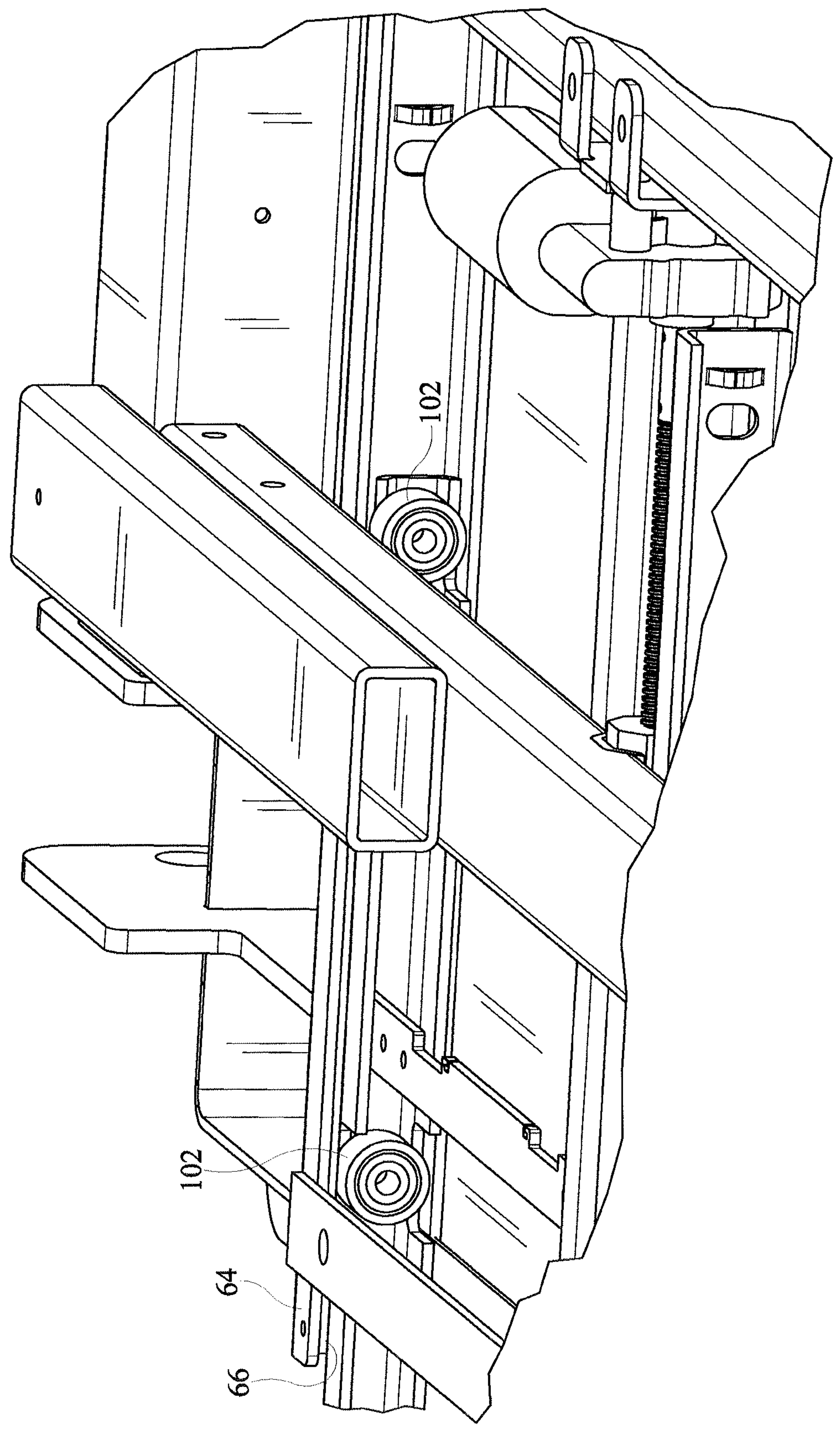
FIG. 6 is a view of a portion of a deck segment as seen by an observer looking from beneath the segment showing part of a width expansion wing in relation to a crossbar of a bed frame.

Each wing comprises a pair of longitudinally spaced apart spars 80, an inboard connector 82 (also referred to as a lead screw support bracket) spanning longitudinally between the spars at their inboard ends, an outboard beam 84 spanning longitudinally between the spars at their outboard ends, and a panel 88 extending between the spars and overlying the outboard beam. As seen best in FIG. 4, outboard edge 90 of panel 88 and outboard face 92 of beam 84 lie in approximately a common vertical plane 94 and therefore define the outboard lateral extremity of the wing. Connector 82 includes a lead screw receiver 96 comprising a threaded bore 98 (seen best in FIGS. 14-15) that penetrates through the connector. The receivers on the left and right wings are oppositely handed and each receiver is nonmovable relative to its respective wing. Each wing spar 80 nests in one of the deck segment C-channels 64 so that the spars, and therefore the wing, are laterally translatable relative to fixed width section 52. As seen best in FIG. 6, the illustrated embodiment includes bearings 102 rotatably attached to the spars to reduce resistance when the wings translate relative to the fixed section. Other types of interfaces between the spars and the C-channels, such as rollers, could also be used.

Figure 7:
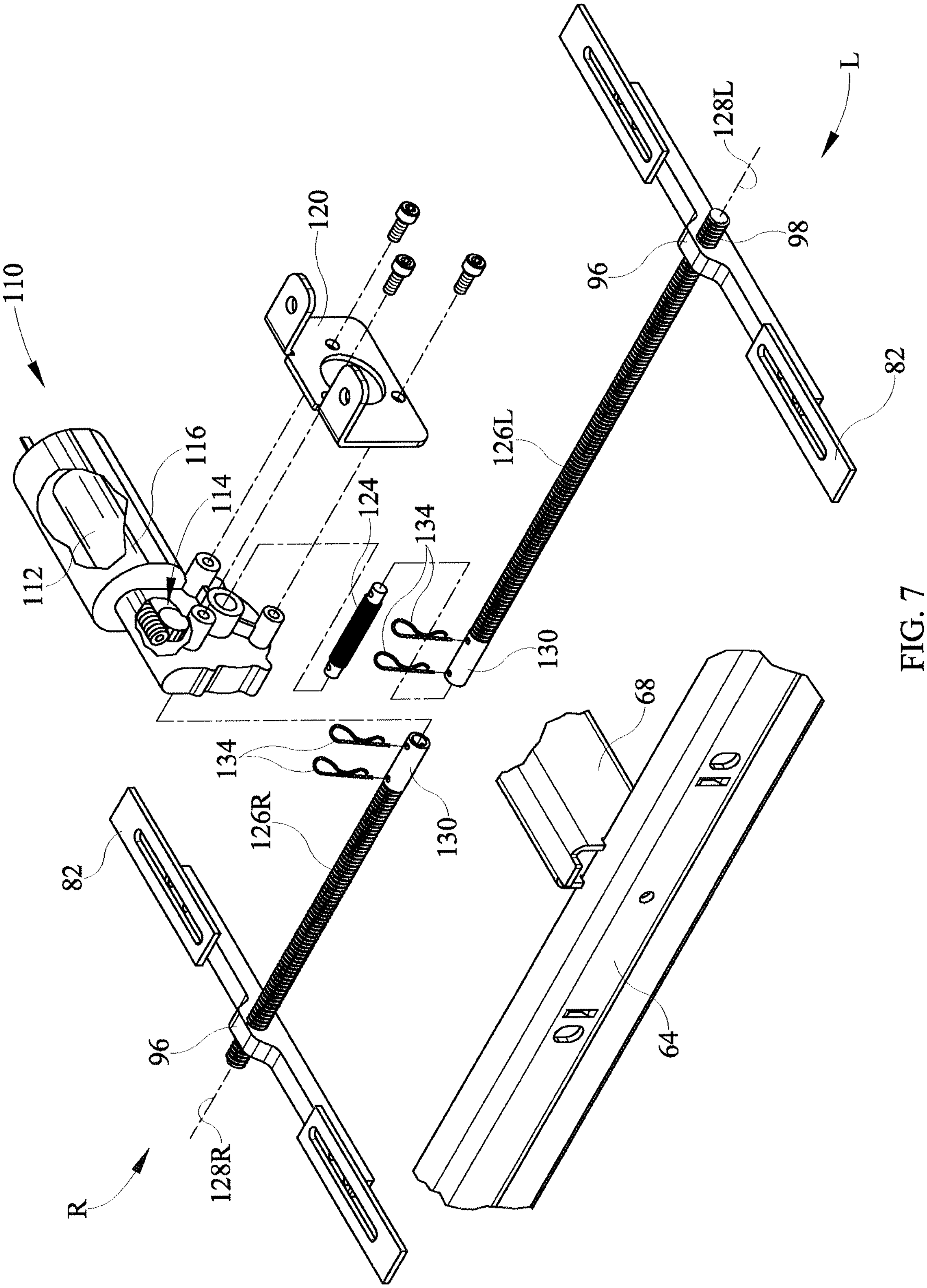
FIG. 7 is a partially exploded perspective view of a motor assembly, a motor mounting bracket, a coupling shaft, a pair of a lead screws, and a coupling collar shown in the context of a bed frame crossbar and an inboard connector component of a typical width expansion wing.

Referring additionally to FIG. 7, the bed also includes a leadscrew driver such as motor assembly 110 comprising an electric motor 112 and a gear train 114, such as a worm and pinion, housed in a housing 116. The motor assembly is mechanically grounded to fixed width section 52. Specifically the motor assembly is bolted to a motor mounting bracket 120 which itself is bolted to rail 68. A coupling shaft 124, which is rotatably driven by the gear train, projects out of the left and right sides of housing 116. One end of a lead screw 126L having a rotational axis 128L is coupled to one end of shaft 124, and therefore to motor assembly 110, by a coupling collar 130 and a pair of R-pins 134. The other end of lead screw 126L is received in receiver 96 of left wing 50L. Another lead screw 126R is coupled to the other end of shaft 124, and therefore to motor assembly 110, by another coupling collar 130 and an additional pair of R-pins 134. The other end of lead screw 126R is received in receiver 96 of right wing 50R so that its rotational axis 128R is colinear with axis 128L. The colinear axes 128L, 128R define a common rotational axis for the lead screws. Lead screws 128L, 128R are oppositely handed as are the lead screw receivers in the left and right wings. Each lead screw and its receiver are same-handed.

Figure 8:
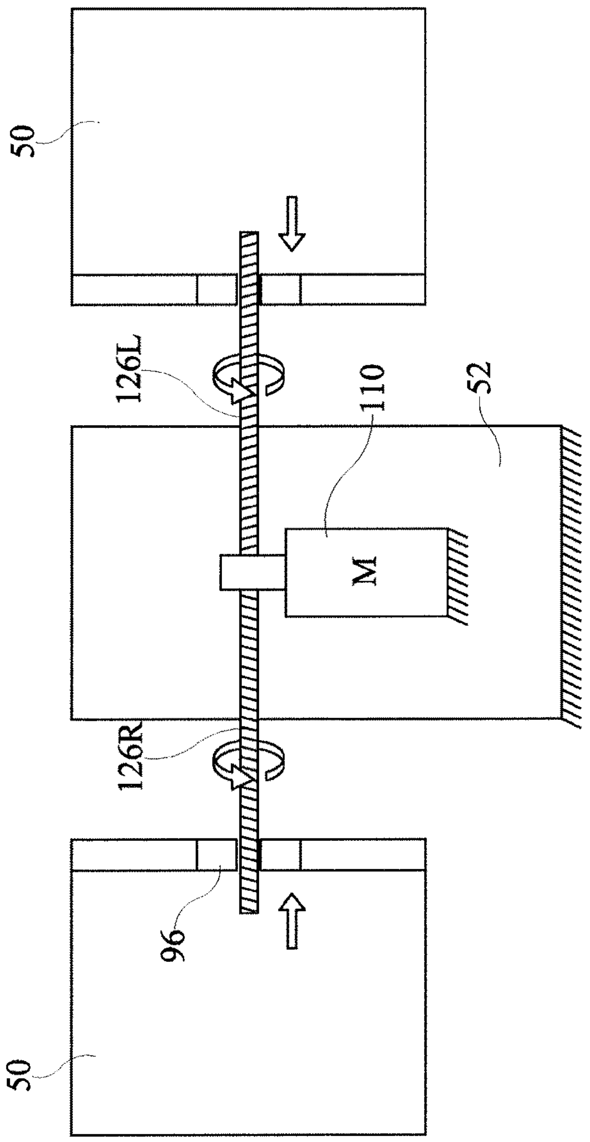
FIGS. 8-9 are schematic plan views comparing kinematic inversions of beds with width expansion wings.
Figure 9:
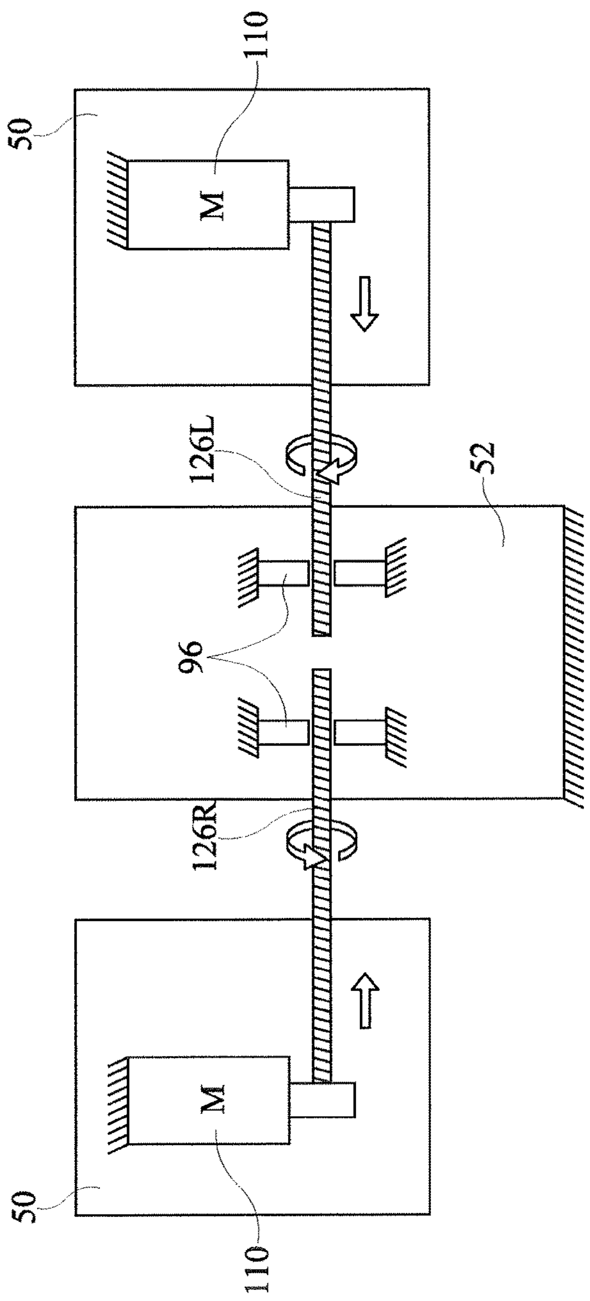

FIG. 8 schematically show the above described kinematic arrangement in which the motor assembly 110 is mechanically grounded to fixed width section 52 and the lead screw receivers are nonmovably associated with each wing. FIG. 9 shows a kinematic inversion in which a motor assembly 110 is mechanically grounded to each wing 50 and the lead screw receivers are nonmovably associated with fixed width sections 52. In the architecture of FIG. 9 coordination of the direction of movement of the width expansion wings can be accomplished with oppositely handed lead screws or with opposite motor rotational directions.

Figure 5B:
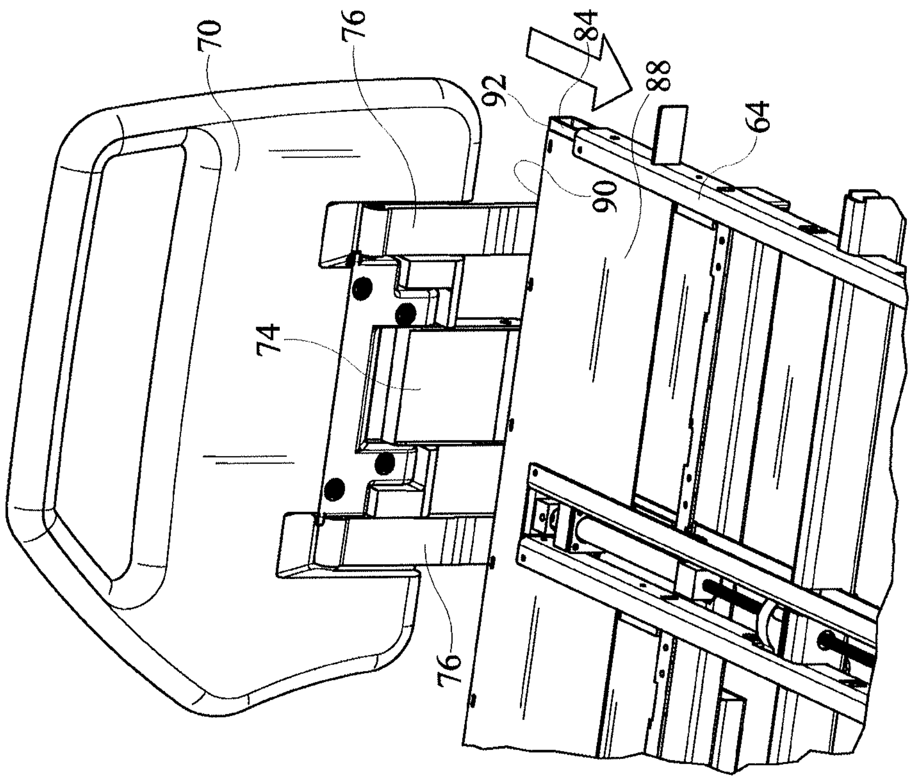
FIGS. 5A and 5B are perspective views showing the right outboard portion of a typical deck segment, specifically a torso deck segment, with a width adjustment wing in its deployed state (FIG. 5A) and its stored state (FIG. 5B) as seen by an observer looking from above the segment. A deck plate which rests atop the deck framework is absent from the illustration in order to expose to view components that would otherwise be obscured.
Figure 5A:
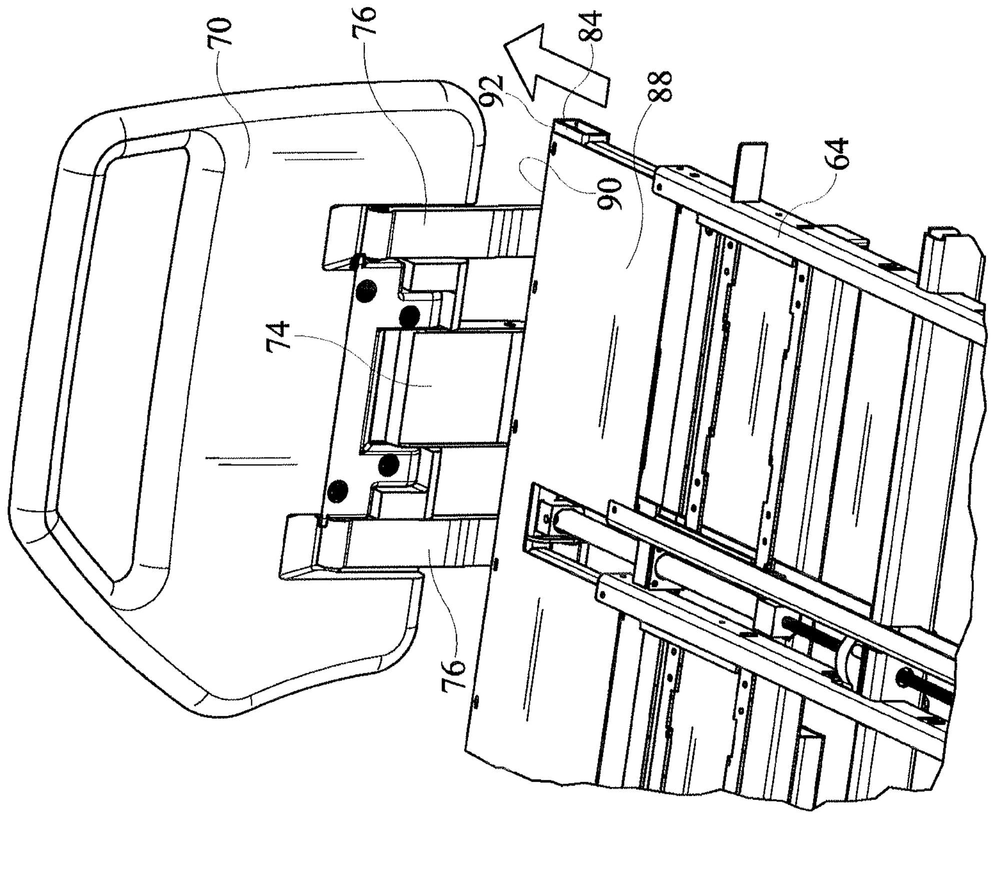
Figure 10:
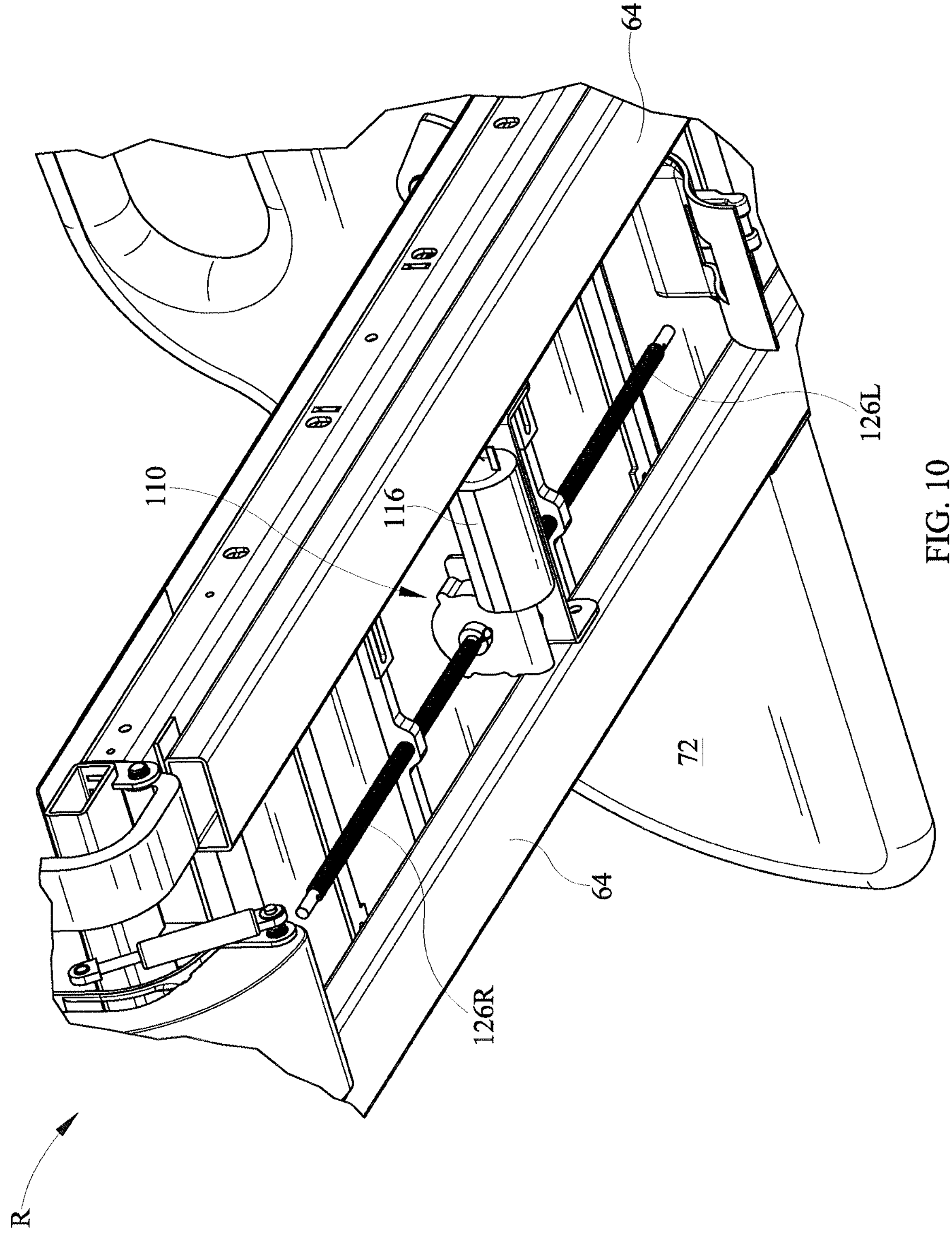
FIG. 10 is a perspective view of a portion of a seat deck segment as seen from beneath the segment showing an alternative mounting bracket for the motor assembly and also showing the width expansion wings in their stored positions.

In practice, operation of the motor in a first rotational direction moves the left and right wings in unison in a laterally outboard direction. Operation of the motor in a second rotational direction, opposite that of the first rotational direction, moves the wings in unison in a laterally inboard direction. In particular the motor can move the wings between a deployed position in which the lateral extremity 92 of the wing is outboard of the outboard edge 56 or 58 of the fixed width section 52 (e.g. FIGS. 2-5A) and a stored position in which the lateral extremity 92 is inboard of its deployed position (FIGS. 5B, 10). When the wing is stored its outboard extremity 94 may be outboard of, inboard of, or substantially laterally aligned with outboard edge 56 or 58 of fixed width section 52.

Figure 11:
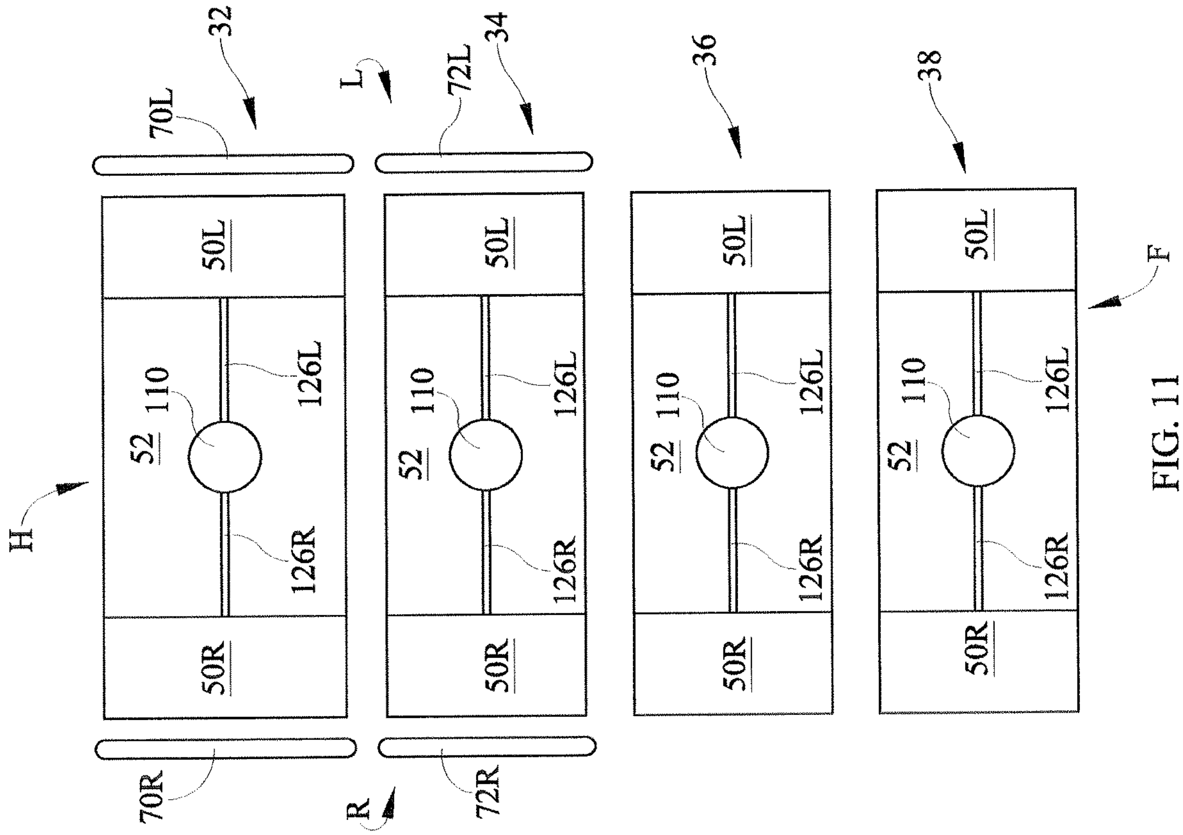
FIG. 11 is a schematic plan view of a bed with width expansion wings coupled to each of four deck segments and with a dedicated motor associated with each segment.

FIG. 11 is a schematic representation of the above described architecture having four deck segments, all four of which are width adjustable. The motor (or a set of motors in the variant in which the motors are mechanically grounded to the wings) is associated with and dedicated to one and only one of the four segments 32, 34, 36, 38. In other words each width adjustable segment has a dedicated motor assembly associated with it for moving the wings coupled to that same segment. In general, in a bed having at least two deck segments, and in which at least two of those segments are width adjustable segments, each segment is serviced by its own dedicated motor assembly or assemblies.

Figure 12:
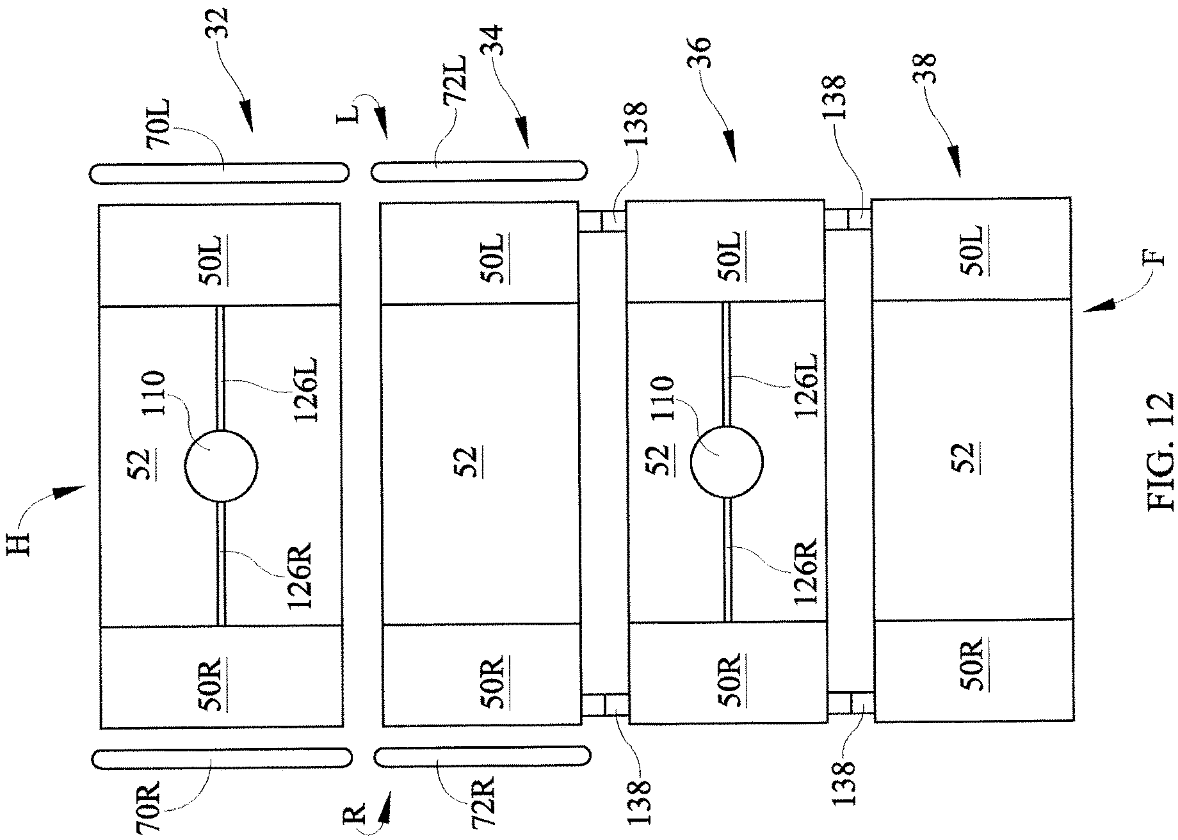
FIG. 12 is a view similar to that of FIG. 11 showing an architecture in which a common motor services the width expansion wings of more than one deck segment.
Figure 13:
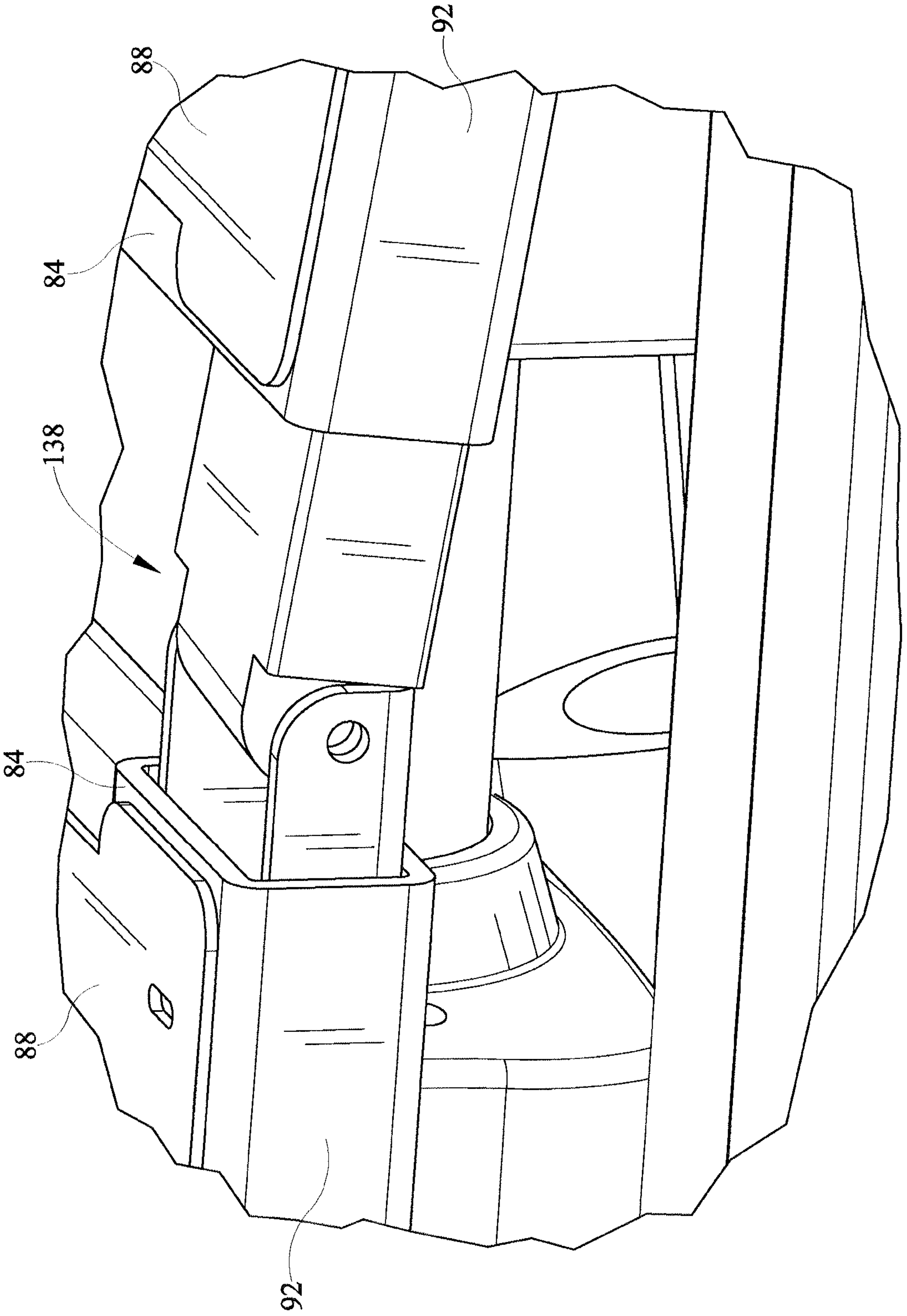
FIG. 13 is a side view showing a link connecting the width expansion wings of neighboring deck segments.

FIGS. 12-13 show an alternative in which the wings of at least two of the width adjustable segments are movable by a common motor assembly. Specifically, a motor assembly 110 is mechanically grounded to center section 52 of thigh deck segment 36. Wings 50 of segment 36 are master wings driven directly by the common motor assembly. Wings 50, of the seat and calf segments 36, 38 are slave wings connected to the master wing by a link 138 which conveys the lateral motion of the master wings to the slave wings. The slave wings are considered to be indirectly driven because the master wings intervene between the motor assembly and the slave wings. The wings of the upper body section of FIG. 9 are serviced by a motor dedicated to the upper body section.

Figure 15:
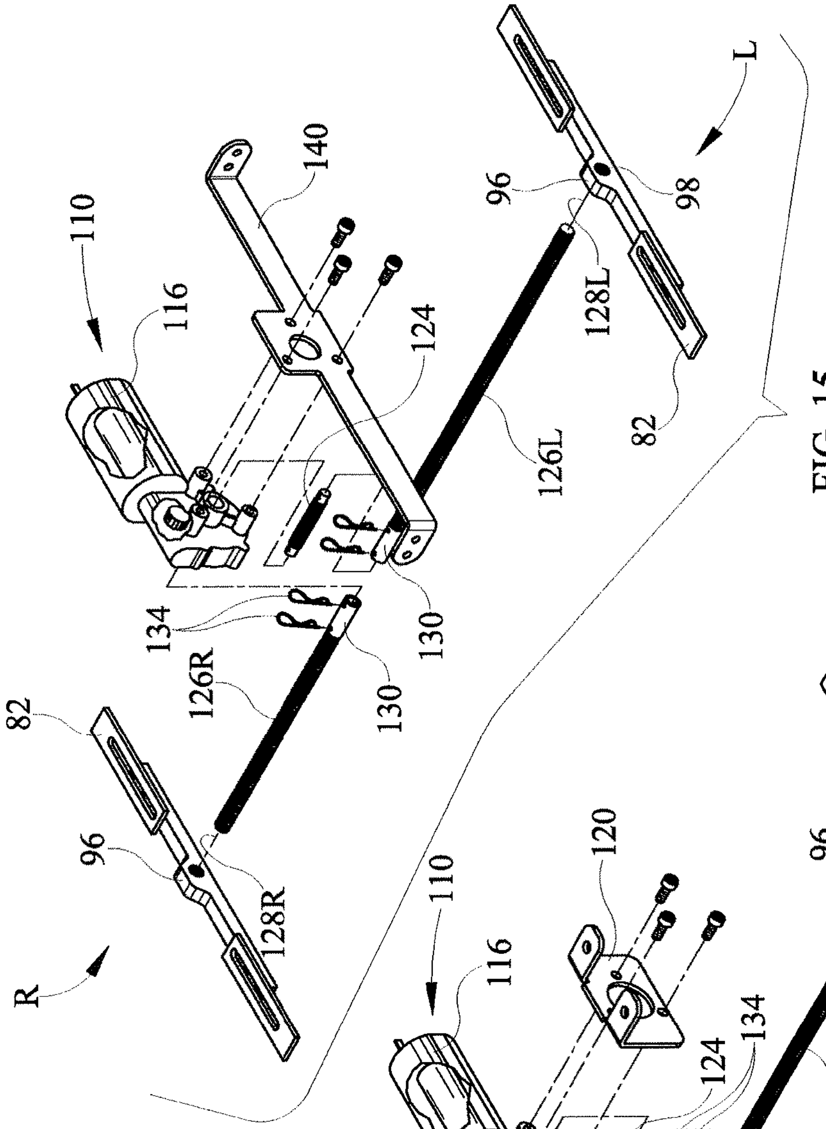
FIG. 15 is a perspective view of components of an alternative retrofit kit for upgrading a bed having manually operated width expansion wings, the kit including an alternative motor assembly mounting bracket for attaching a motor assembly to a bed frame that does not already include a frame component suitable for mounting the motor assembly.
Figure 14:
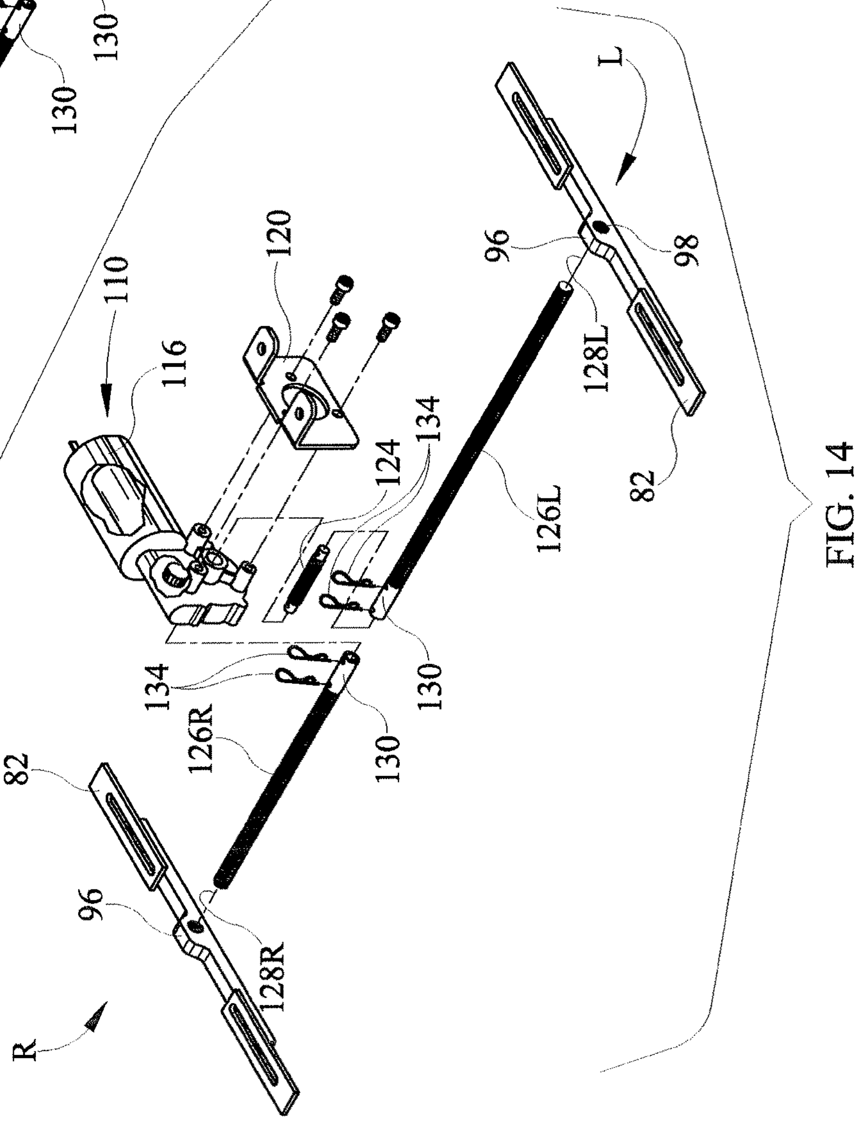
FIG. 14 is a perspective view of components of a retrofit kit for upgrading a bed having manually operated width expansion wings, the kit including a motor assembly mounting bracket for attaching a motor assembly to a suitably located bed frame component.

The foregoing explanation and accompanying illustrations are directed to beds manufactured with the powered width adjustment feature. However a retrofit kit may be provided for upgrading beds having manually operable width expansion wings. As seen in FIGS. 14-15 a retrofit kit includes at least a motor assembly 110, a motor mount bracket 120 (FIG. 14) or 140 (FIG. 15) for mounting the motor assembly to a bed frame, a lead screw set comprising oppositely handed lead screws 126L, 126R each of which is attachable to the motor assembly, and a lead screw support bracket set comprising a pair of lead screw support brackets 82. The members of the lead screw support bracket set have oppositely handed lead screw receivers 96 and are securable to a width extension wing e.g. by welds or bolts. Other hardware such as a coupler shaft 124, coupling collars 130, R-clips 134 and other fasteners may also be part of the kit. Although FIGS. 14-15 show several kit components as individual parts, certain kit components, such as the motor assembly and motor mount bracket, can be preassembled to each other rather than provided as individual components.

Figure 16:
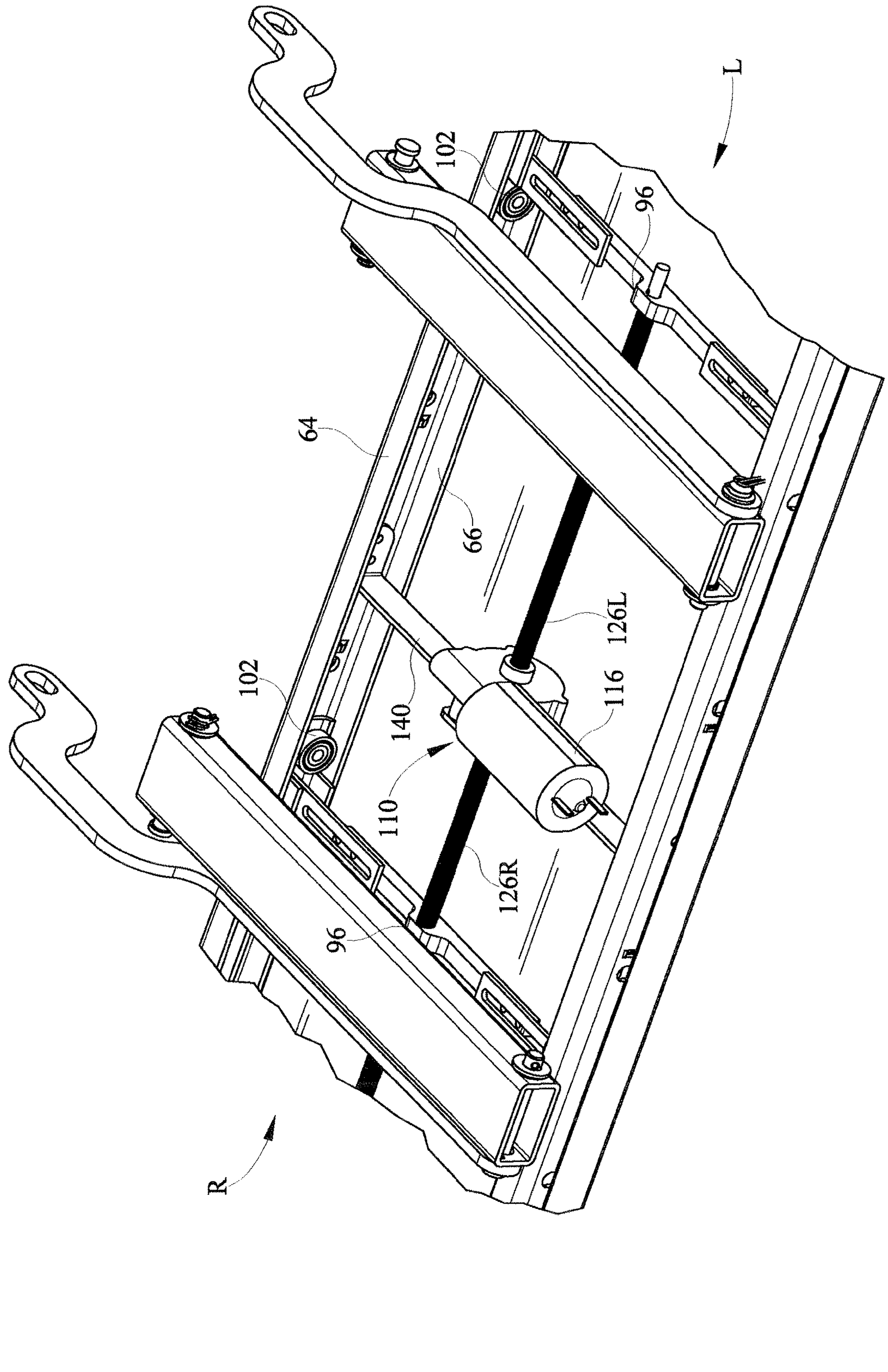
FIGS. 16-18 are perspective views of a portion of a deck segment, as seen from beneath the segment, showing the alternative bracket of FIG. 15 used to mount a motor assembly.
Figure 17:
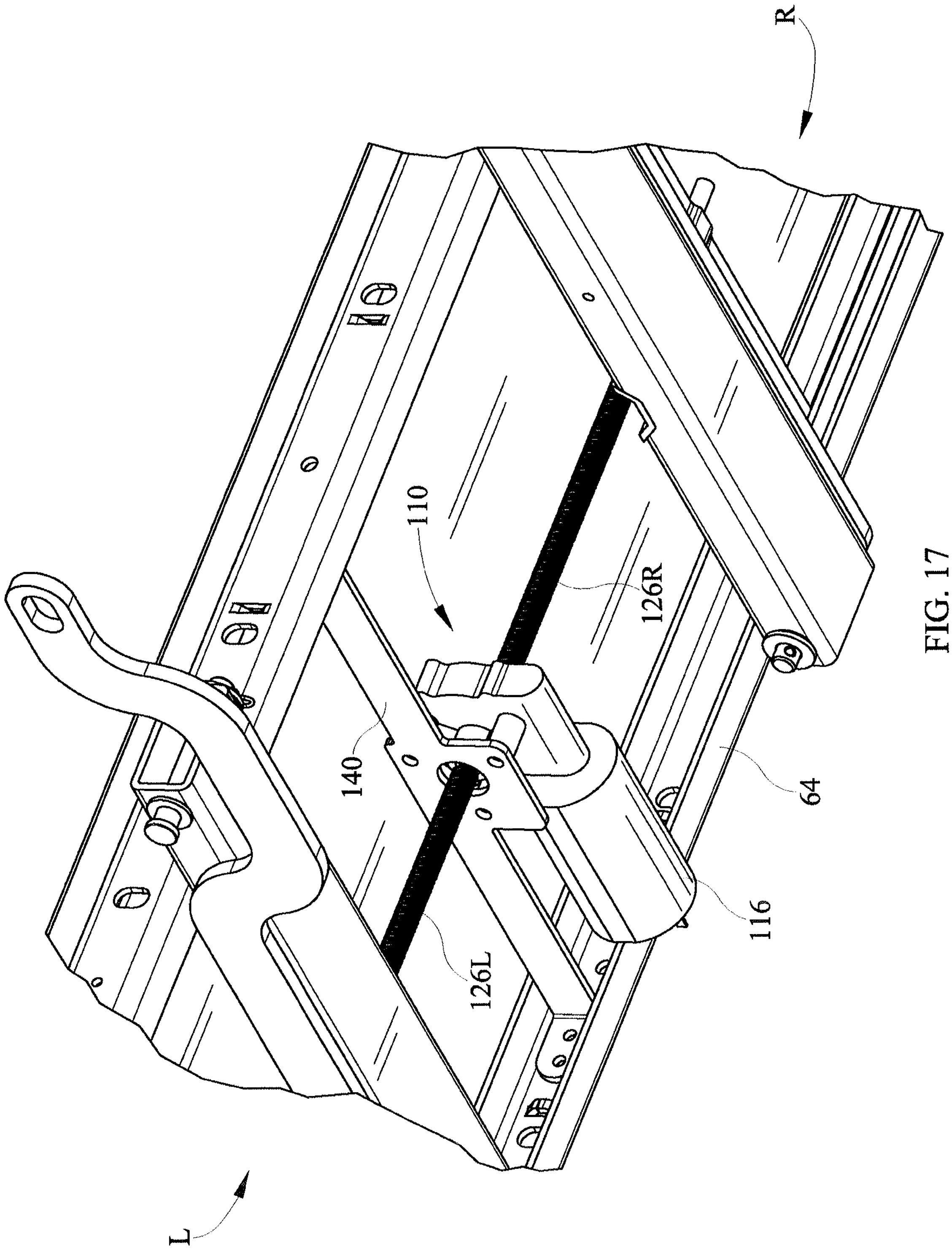
Figure 18:
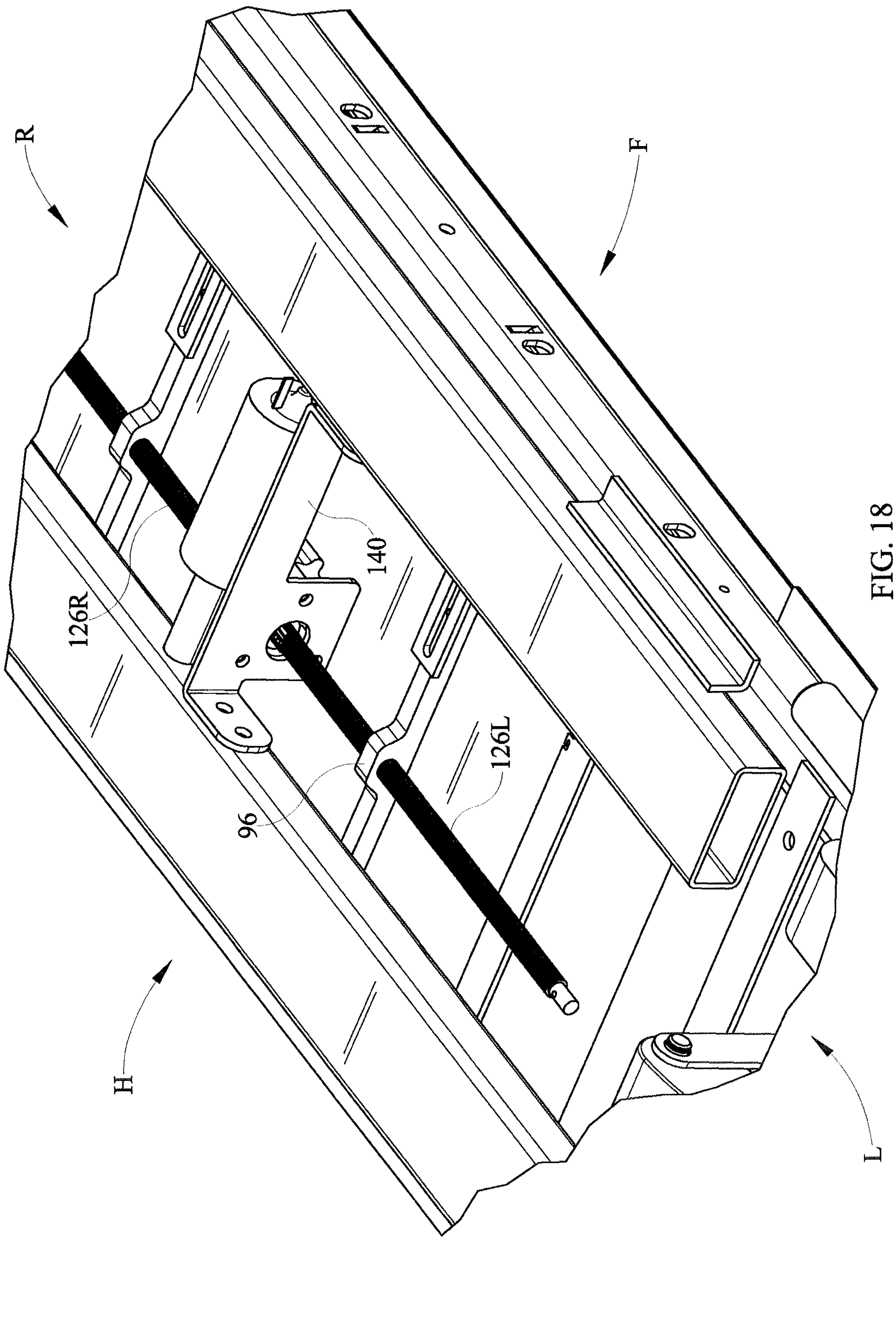

FIGS. 14 and 15 show two different styles of motor mount brackets. Motor mount bracket 120 of FIG. 14 is configured to attach the motor assembly to a preexisting, longitudinally extending rail 68 of the bed frame, for example rail 68 of FIG. 3. Motor mount bracket 140 of FIG. 15 is configured to span longitudinally between crossbars 64 of the bed frame. The ends of brackets 140 are secured to the crossbars by bolts (not shown). Bracket 140 is useful if the deck segment or segments of interest do not have a suitable, preexisting rail 68 to which the bracket can be attached. FIGS. 16-18 are views of bracket 140 shown in the context of a bed frame but with the mounting bolts not illustrated.

Figure 19:
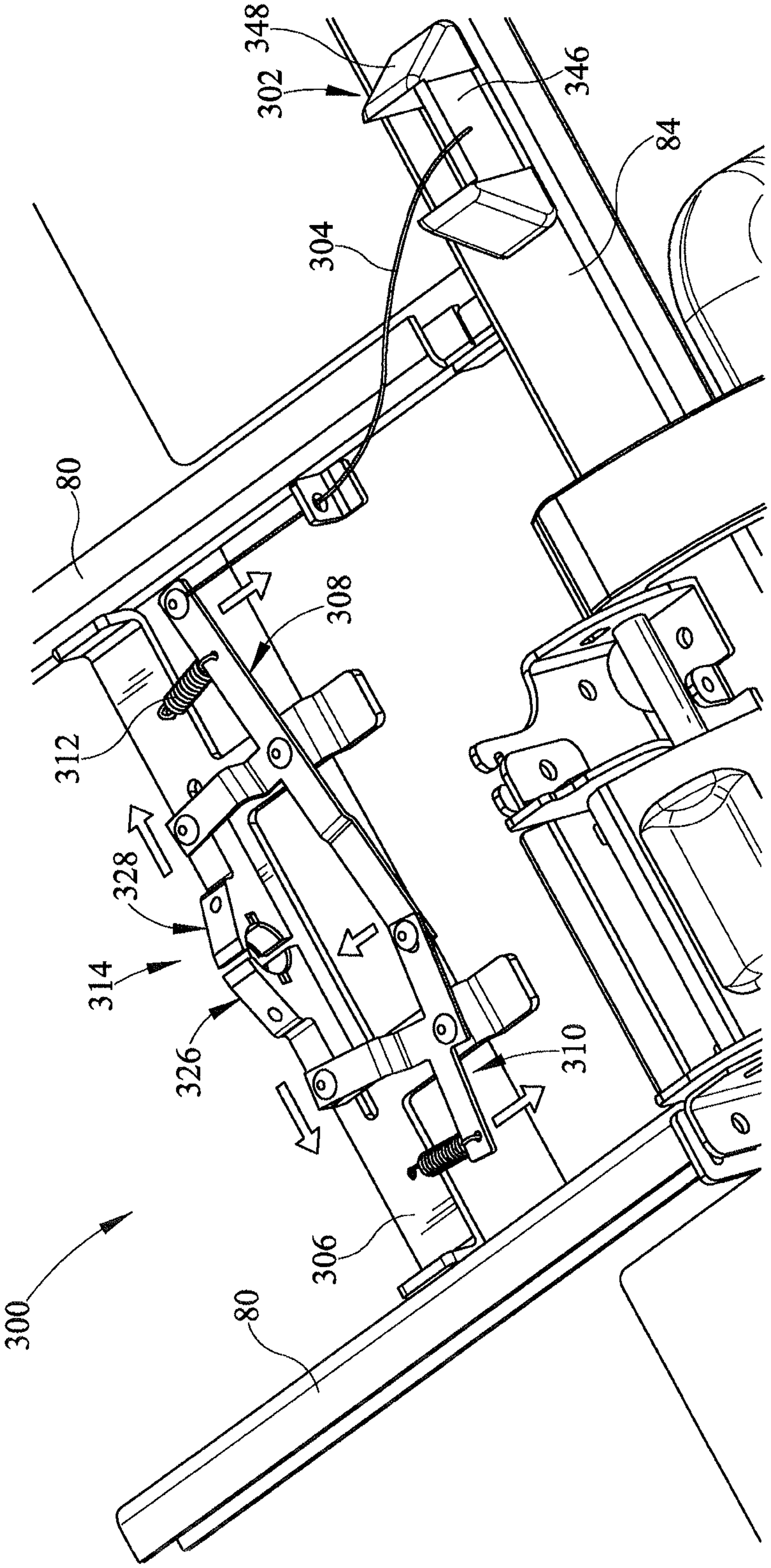
FIGS. 19, 20, 20A and 21 are perspective views of a manual release according to one illustrative embodiment of the current disclosure including a carrier.
Figure 20:
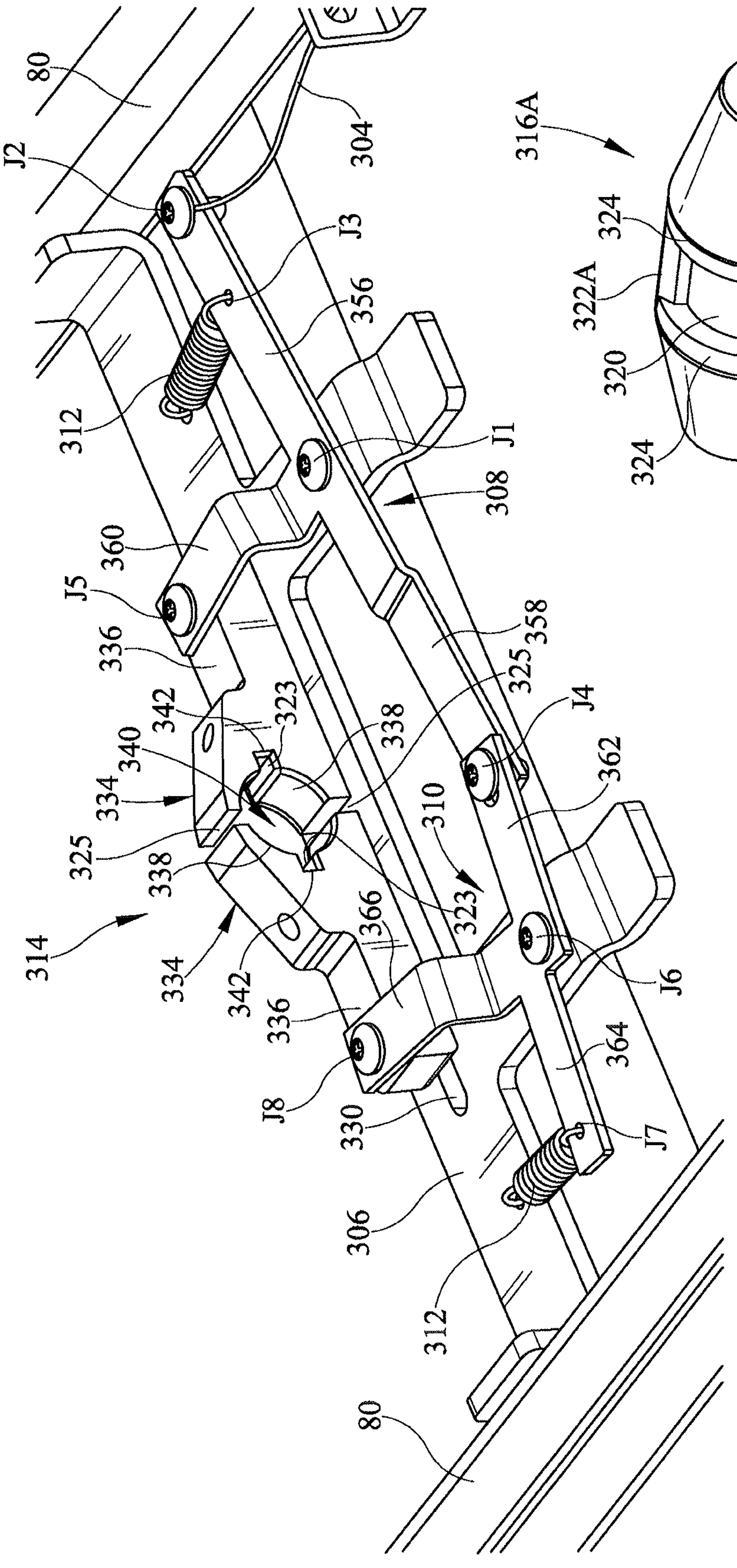
Figure 20A:
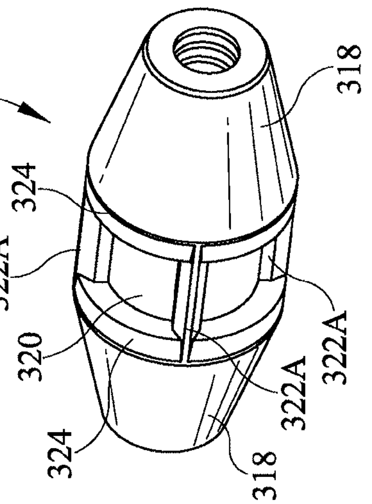
Figure 21:
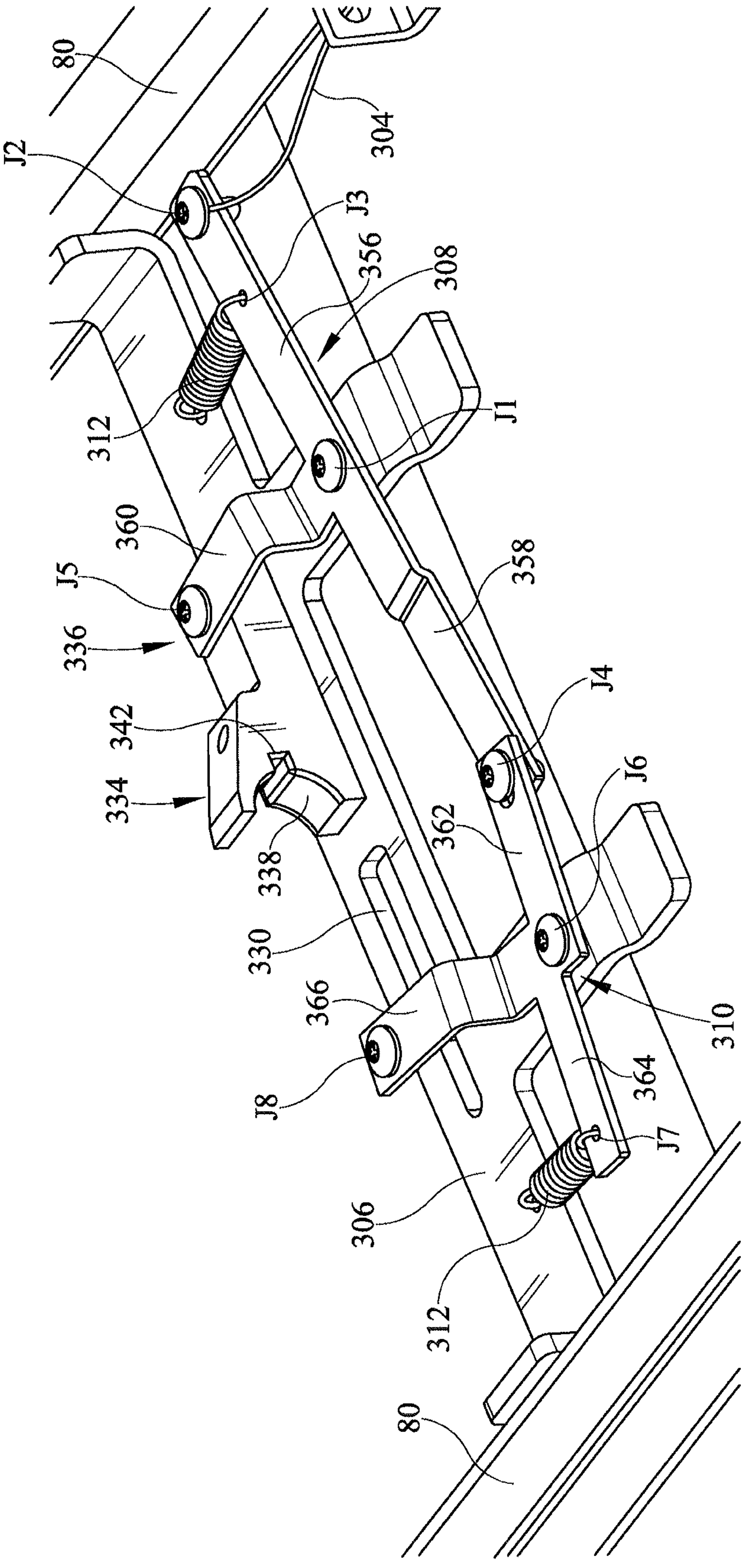

FIGS. 19-21 show a manual release 300 according to one illustrative embodiment of the current disclosure, which takes the place of connector 82 of previously described embodiments. Manual release 300 comprises a release unit which includes a split clasp 314. In some embodiments, including that of FIGS. 19-21, the release unit also includes a carrier such as carrier 316A (FIG. 20A) in addition to the split clasp. The release unit plays a role similar to that of leadscrew receiver 96 of previously described embodiments. The manual release 300 allows a user to disengage the split clasp from the lead screw 126, or from the carrier in embodiments that include a carrier, so that the user can manually position the wing 50.

The manual release 300 includes a handle 302, a cable 304, a support bracket 306, a first pivot arm 308, a second pivot arm 310, springs 312, and a clasp 314. When the user wishes to manually position the wing 50, the user actuates the handle 302 to pull on the cable 304 and cause the first pivot arm and the second pivot arm to rotate, which moves the clasp 314 from a first position where the clasp 314 engages a carrier 316 coupled to the lead screw 126 to a second position where the clasp 314 is disengaged from the carrier 316.

The clasp 314 is coupled to the support bracket 306 and includes a first clasp portion 326 and a second clasp portion 328. The support bracket 306 is coupled between the wing spars 80 and includes guide slots 330 (FIG. 21) that are configured to be engaged by the first clasp portion 326 and the second clasp portion 328.

The carrier 316A is generally cylindrically shaped and includes tapered ends 318 and a recessed center portion 320 positioned between the tapered ends 318. In one possible embodiment (e.g. FIGS. 19-21) first ends 334 include a curved portion 338 that defines an opening in the form of a circular bore 340 when the first ends 334 of first clasp portion 326 and the second clasp portion 328 face one another. In the embodiment of FIGS. 19-21 the perimeter of the circular opening is interrupted by notches 323 and spaces 325 between the clasp portions as seen best in FIG. 20. The carrier 316A is compatible with the notched/circular opening. As seen in FIG. 20A the carrier 316A has four equiangularly distributed keys 322A. The keys 322A and the corresponding notches 323 and spaces 325 in the clasp halves cooperate to prevent the carrier from rotating relative to the clasp when the clasp engages the carrier. In some contemplated embodiments, the carrier 316A includes a second tapered portion 324 extending between the tapered ends 318 and the recessed portion 320. The carrier 316 includes internal threads that engage the external threads on the lead screw 126 and allow the carrier 316 to move along the lead screw 126. Provided the clasp 314 is engaged with the carrier, the motion of the carrier along the leadscrew (e.g. when the leadscrew is rotated by an electric motor) will move the clasp laterally and will therefore move the wing between its extended (deployed) and retracted (stored) positions. If a user wishes or needs to move the wing manually he may disengage the clasp from the carrier by way of handle 302, as described below in more detail, and push or pull the wing to the desired position. As a result the clasp will no longer be laterally aligned with the carrier. When the user releases handle 302 the clasp halves 326, 328 return to their first position, i.e. the position in which they would engage the carrier if the carrier were between the clasp halves. To reengage the clasp and carrier with each other the user can push or pull the wing, and therefore the carrier, toward the clasp. As the user continues to move the wing and carrier the carrier tapered ends 318 cause the clasp 314 to open and allow the tapered end 318 to pass through so that the clasp 314 can re-engage the recessed portion 320 and keys 322A of the carrier. The keys 322A are configured to engage the clasp 314 to prevent rotation of the carrier 316A with respect to the clasp 314. If the carrier 316A were allowed to rotate, the carrier 316A would not travel along the lead screw 126 and the wing 50 would not be extended.

The first clasp portion 326 and the second clasp portion 328 are configured to cooperate to removably retain the carrier 316A. The first clasp portion 326 and the second clasp portion 328 include a guide follower 332 (FIG. 33), a first end 334 configured to engage the carrier 316, and a second end 336 configured to be pivotably coupled to the first pivot arm 308 (or the second pivot arm 310). The guide followers 332 are configured to be positioned in the guide slots 330 and to move along the guide slots 330 between a second position where the first clasp portion 326 and the second clasp portion 328 are separated a distance to disengage the carrier 314 and a first position where the first clasp portion 326 and the second clasp portion 328 cooperate to removably retain the carrier 314.

Figure 22:
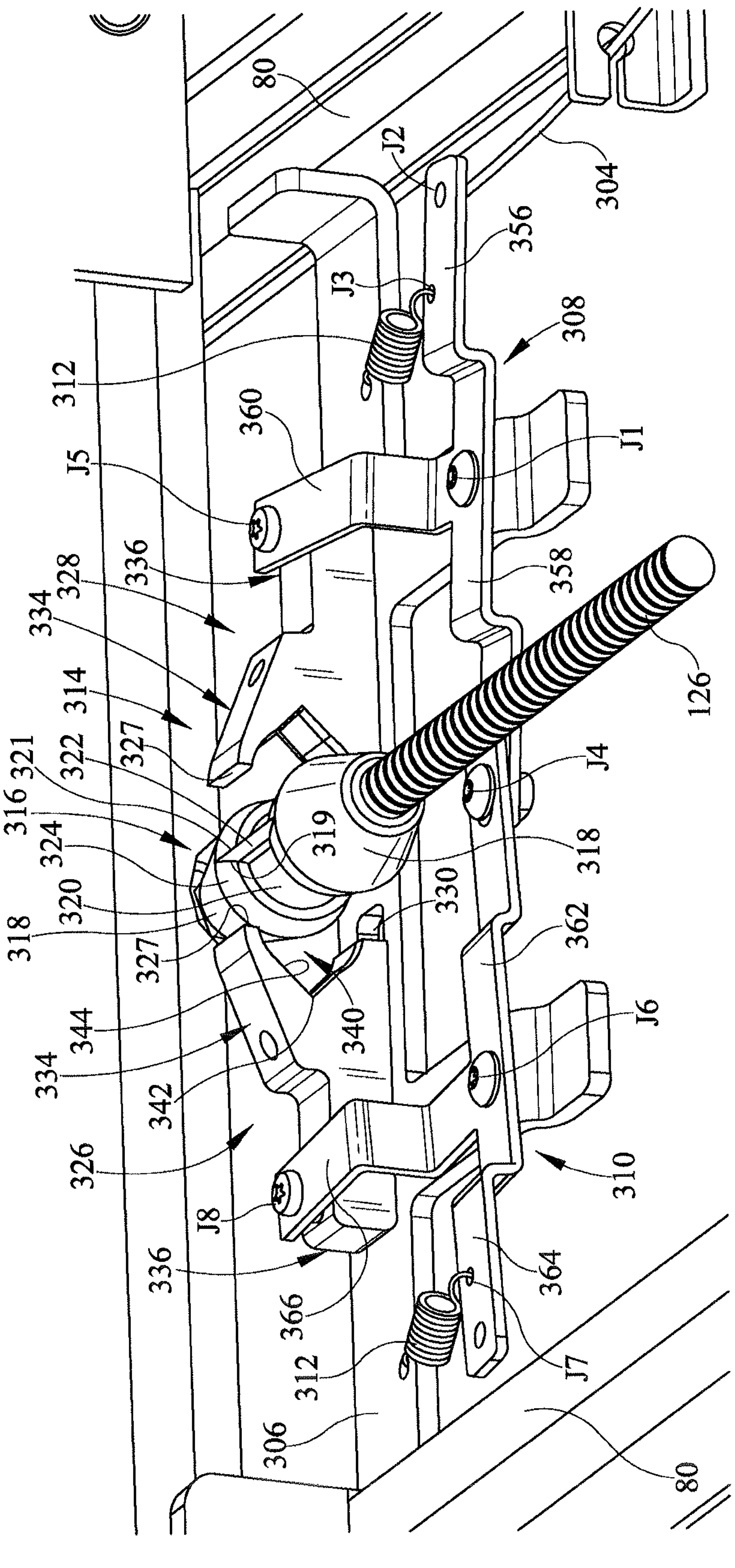
FIG. 22 is a perspective view of a manual release similar to that of FIGS. 19-21 according to another illustrative embodiment.
Figure 23:
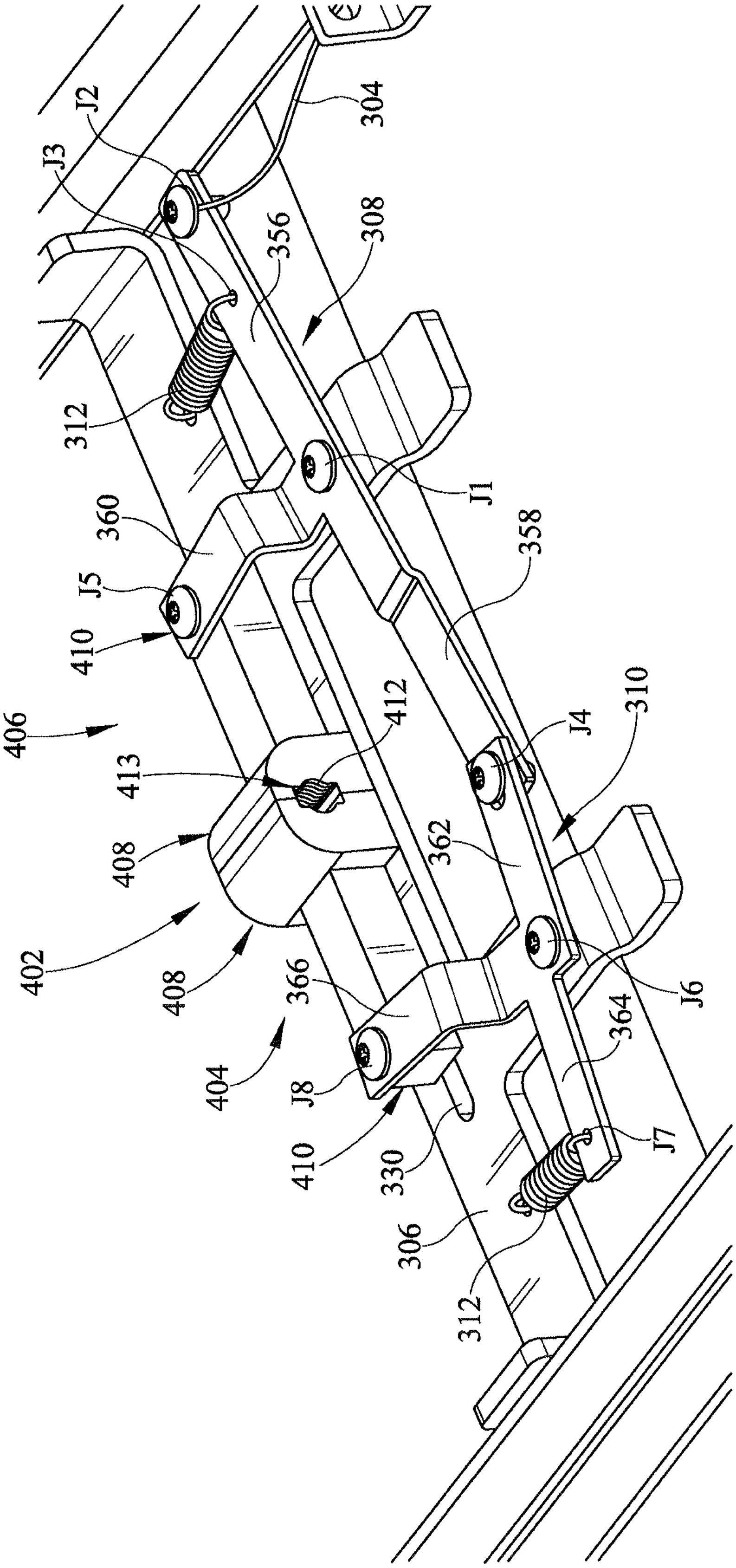
FIGS. 23-24 are perspective views of a manual release according to another illustrative embodiment of the current disclosure.
Figure 24:
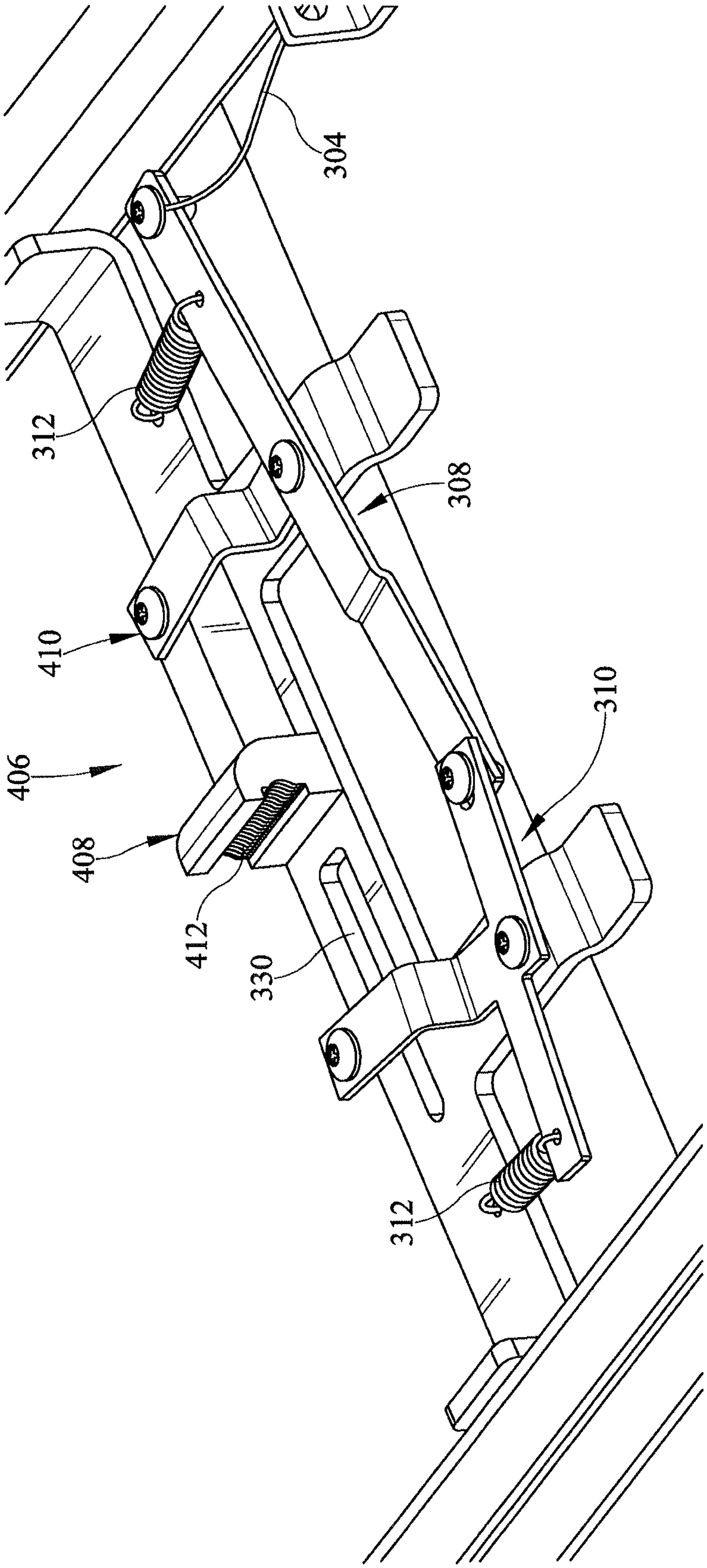
Figure 25:
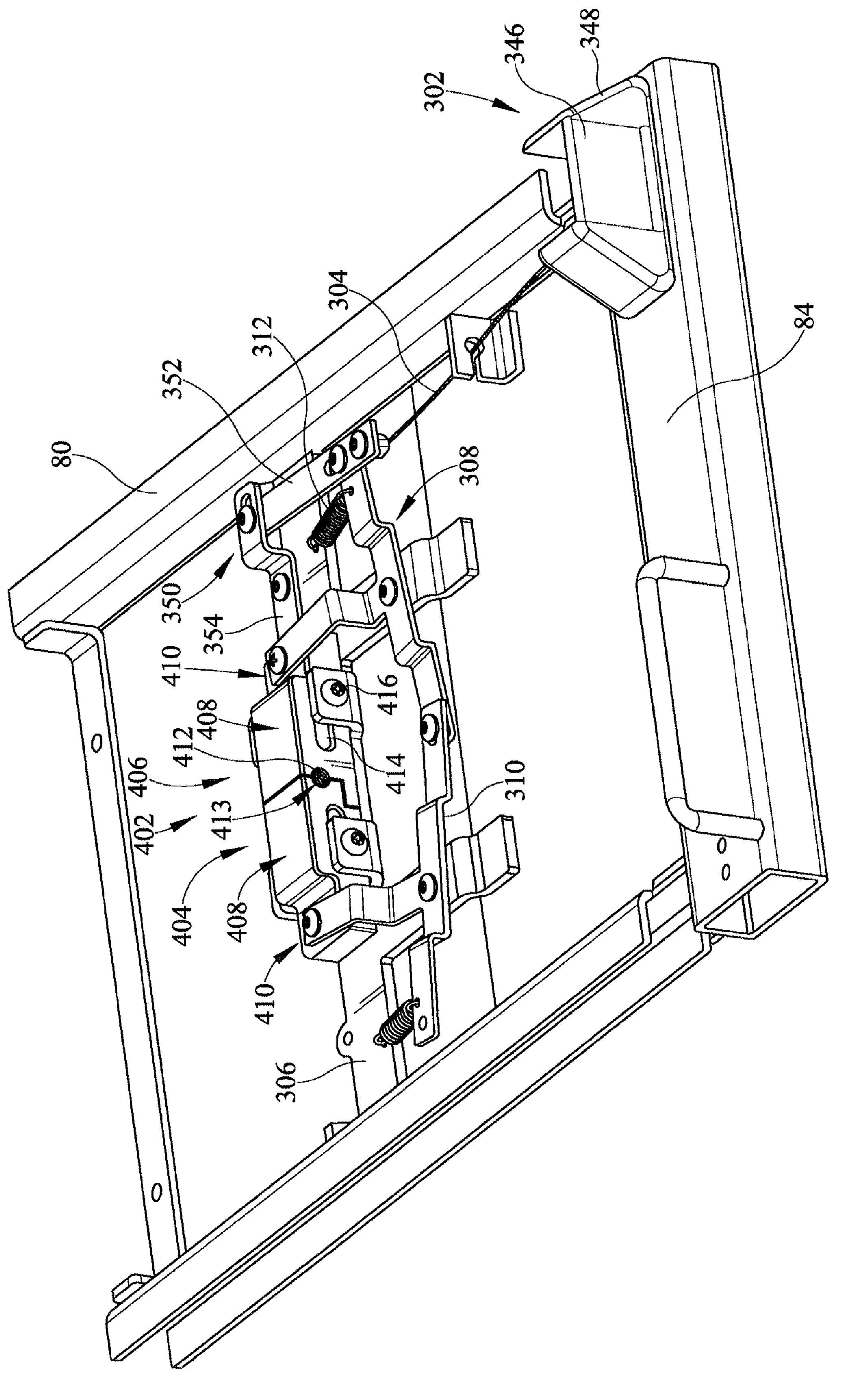
FIGS. 25-27 are perspective views of the manual release of FIGS. 23-24 according to another illustrative embodiment.

In another embodiment (FIG. 22) bore 340 is noncircular. Carrier 316 includes a first tapered portion 318, a second tapered portion 324 and a central recessed portion 320. The carrier 316 includes internal threads that engage the external threads on the lead screw 126 and allow the carrier 316 to move along the lead screw 126. Carrier 316 includes two keys 322, a first key which is visible in the illustration and a second key which is the same as the first key but extends along the recessed center portion at a location 180 degrees offset from the first key and therefore is not visible in the illustration. Each key has a pair of flanks 319, only one of which is visible in FIG. 22. The upper portions of the flanks are angled toward each other to form a peak 321. In the embodiment of FIG. 22 the clasp portions include a key engaging portion or corner 342 and a key guide surface 344 on the underside of clasp first ends 334. If the clasps are moved toward the carrier and the keys 322 are oriented vertically, surfaces 327 of the clasp portions will engage the keys so that the carrier cannot rotate relative to the clasp. If the keys are oriented slightly off-vertical, surfaces 327 will contact the keys and rotate the carrier so that the keys are vertical. If the key is not oriented substantially vertically, guide surfaces 344 will cause the keys 322, and therefore the carrier as a whole, to rotate toward the key engaging portions or corners 342. The corners, once they engage the keys, prevent further rotation.

Figure 26:
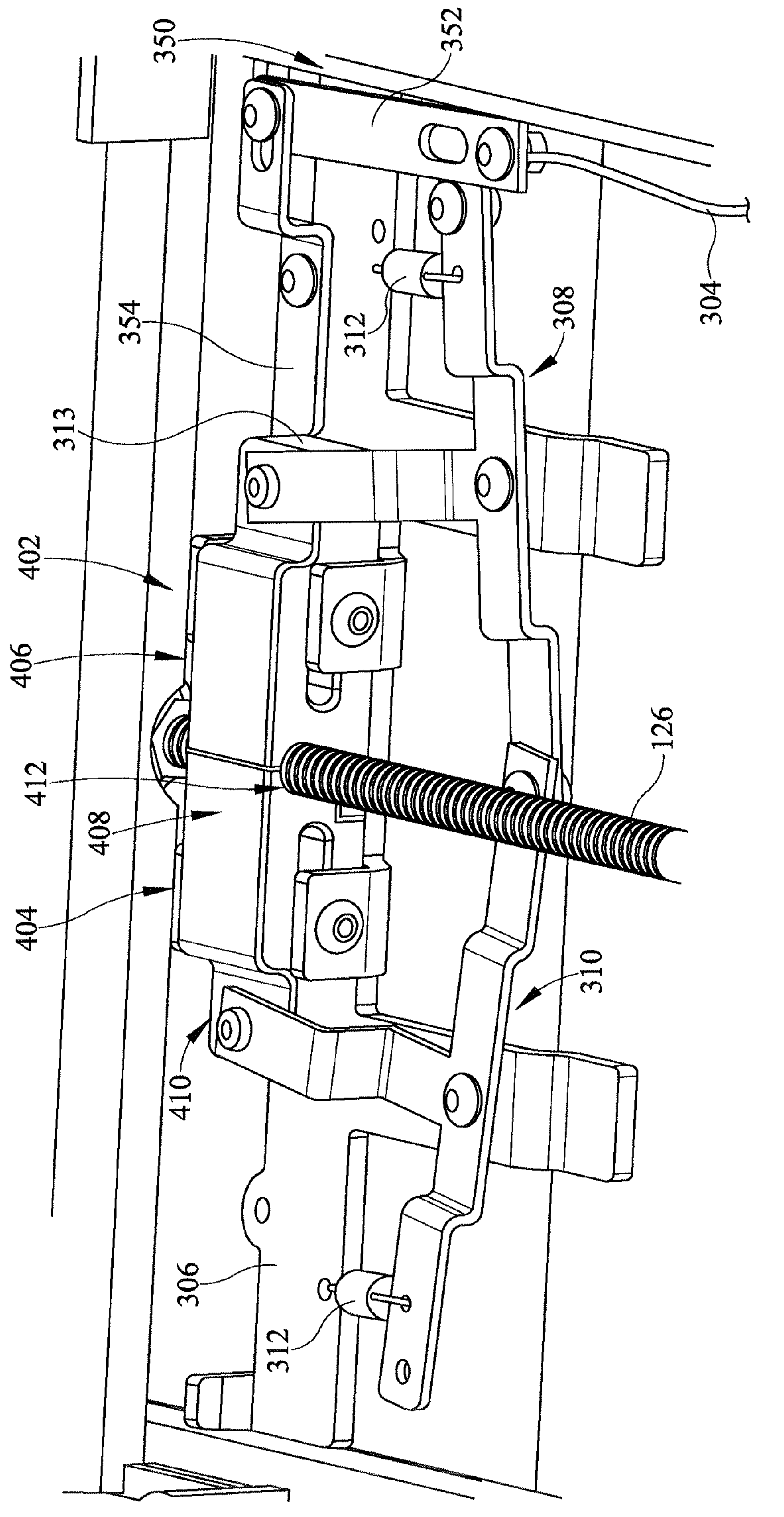
Figure 27:
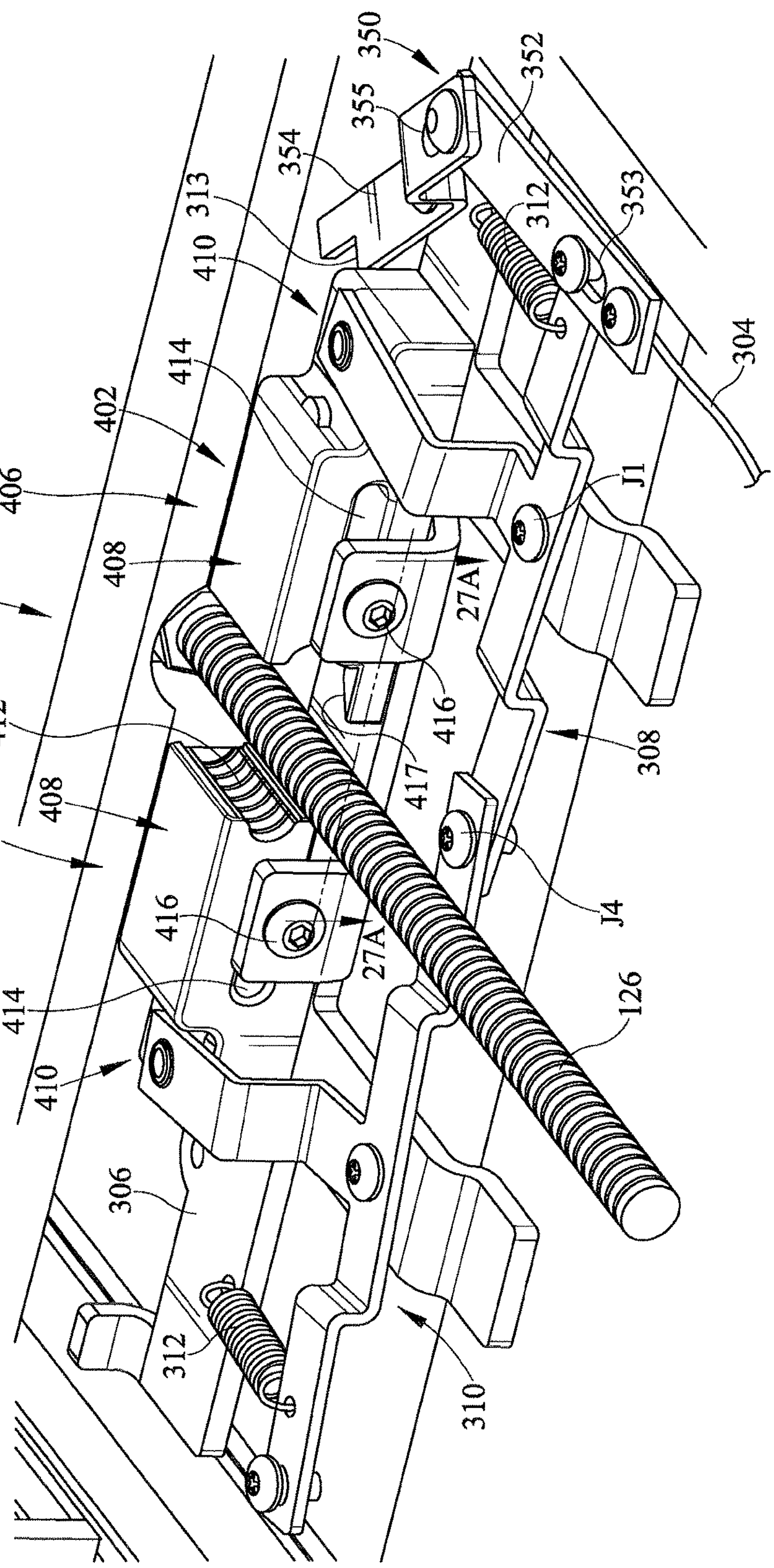

The handle 302 is coupled to the beam 84 and includes a lever 346 pivotably coupled to a handle base 348 and configured to move with respect to a handle base 348 when pulled or pushed by a user. The lever 346 is connected to the cable 304 and is configured to pull on the first pivot arm 308 when the lever 346 is actuated. In one contemplated embodiment, as shown in FIGS. 26 and 27, the cable 304 is coupled to a lock linkage 350 that includes a first link 352 coupled to the first pivot arm 308 and a second link 354 pivotably coupled to the support bracket 306. The second link is configured to selectively engage the clasp 314 for example by abutting contact between the clasp and the end surface 313 of the link. The lock linkage 350 guards against unwanted disengagement of the carrier 316 from the clasp 314, for example when an off-center push or pull force is applied to the wing 50 that would cause the clasp 314 to open slightly and release the carrier 316 if the lock linkage were not present. When the handle 302 is actuated, the cable 304 pulls on the first link 352, which causes the first pivot arm 308 to rotate and the second link 354 to rotate. In some contemplated embodiments, the first link 352 includes a slot 353 that the first pivot arm 308 is coupled to, and the second link 354 includes a slot 355 that the first link 352 is coupled to. The slots allow links 352, 354 to undergo enough motion to disengage link surface 313 from the clasp without causing pivot arms 308, 310 to move and urge the clasp portions away from the leadscrew. Only after the lock linkage is disengaged will continued force on cable 304 cause the clasp portions to move away from the leadscrew.

The first pivot arm 308 is generally T-shaped and is connected to the support bracket 306 at a first joint J1. The first pivot arm 308 includes a first member 356, a second member 358, and a third member 360. The first member 356 is connected to the cable 304 at a second joint J2 and to a spring 312 at a third joint J3. The second member 358 is pivotably connected to the second pivot arm 310 at a fourth joint J4. The third member 360 is pivotably connected to the second clasp portion 328 at a fifth joint J5. As the cable 304 pulls on the first member 356, the first pivot arm 308 rotates about the first joint J1 causing the spring 312 to stretch and the second pivot arm 310 and second clasp portion 328 to move with respect to the support bracket 306.

The second pivot arm 310 is generally T-shaped and is connected to the support bracket 306 at a sixth joint J6. The second pivot arm 310 includes a fourth member 362, a fifth member 364, and a sixth member 366. The fourth member 362 is pivotably connected to the second member 358 of the first pivot arm 308 at the fourth joint J4. The fifth member 364 is connected to a spring 312 at a seventh joint J7. The sixth member 366 is pivotably connected to the first clasp portion 326 at an eighth joint J8. Rotation of the first pivot arm 308 about the first joint J1 causes the second pivot arm 310 to rotate about the sixth joint J6 by way of the second member 358 and the fourth member 362, which causes the spring 312 connected to the support bracket 306 and the second pivot arm 310 to stretch and the first clasp portion 326 to move with respect to the support bracket 306.

The springs 312 are connected between the support bracket 306 and the first and second pivot arms 308 and 310. The springs 312 are configured to bias the first and second pivot arms 308 and 310 to a first position where the first and second clasp portions 326 and 328 engage the carrier 316.

FIGS. 23-27 show a manual release 400 according to another illustrative embodiment of the current disclosure. In this contemplated embodiment, the manual release 400 includes a clasp 402 configured to engage the threads of the lead screw 126 directly rather than by way of a carrier. In order for the wing 50 to be manually moved, the user must maintain actuation of the handle 302 to prevent the clasp 402 from re-engaging the threads on the lead screw 126. When the handle 302 is released, the springs 312 pull on the first pivot arm 308 and the second pivot arm 310 and cause them to rotate from the second position to the first position, which then causes the clasp 402 to move from the disengaged position to the engaged position where the clasp 402 engages the threads on the lead screw 126.

Figure 27A:
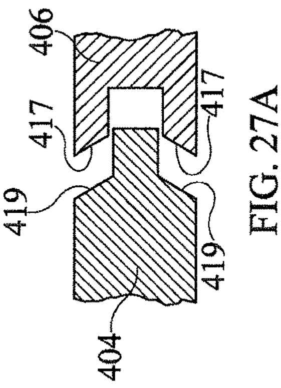
FIG. 27A is a plan view in the direction 27A-27A of FIG. 27.
Figure 28:
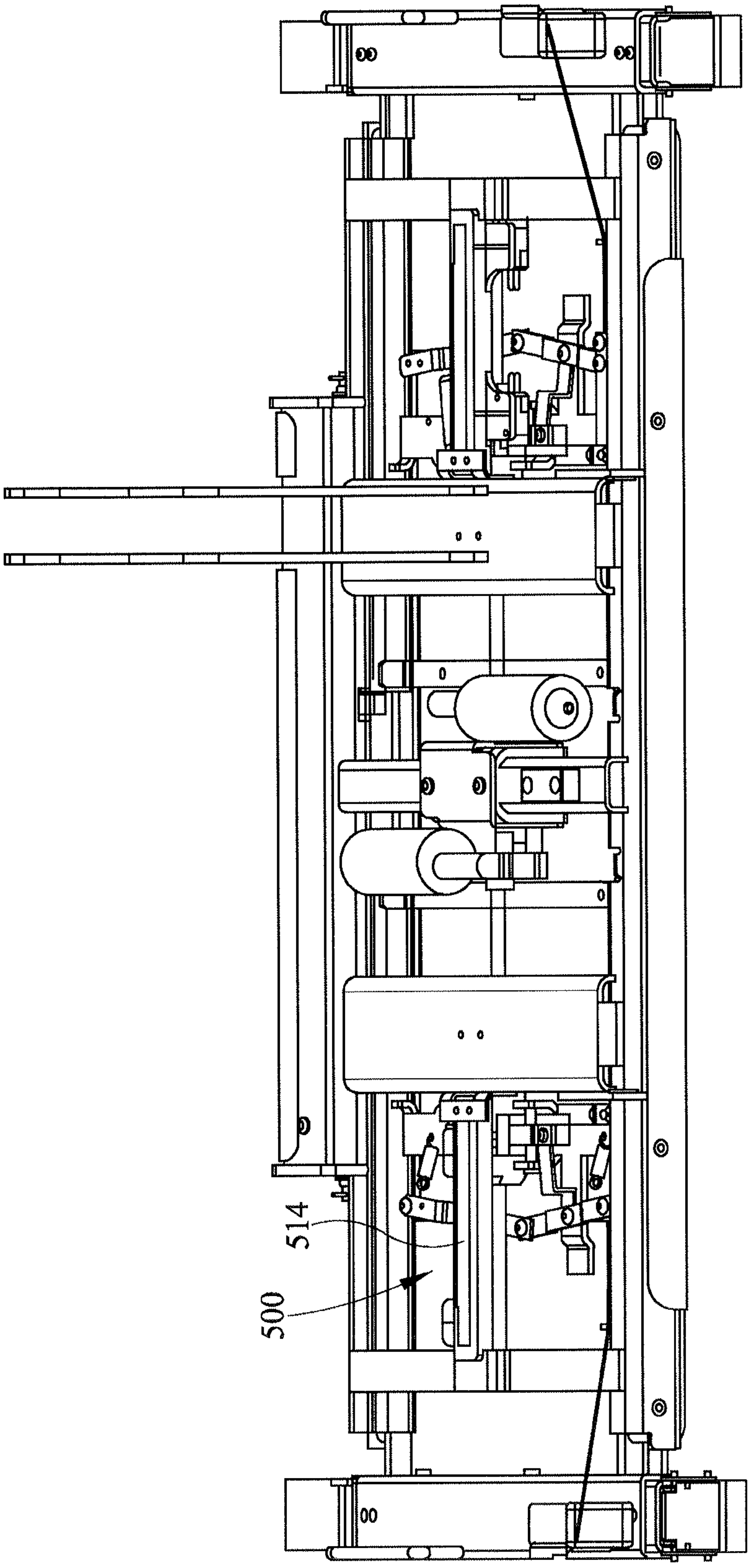
FIGS. 28-32 are perspective views of a manual release according to another illustrative embodiment of the current disclosure.

Clasp 402 includes a first portion 404 and a second portion 406, which operate similarly to the first clasp portion and the second clasp portion previously disclosed herein. The first portion 404 and the second portion 406 each include a first end 408 and a second end 410. The second pivot arm 310 is coupled to the second end 410 of the first portion 404, and the first end 408 includes a threaded portion 412 configured to engage the threads on the lead screw 126. When the first end 408 of the first portion 404 and the first end 408 of the second portion 406 face one another, they cooperate to form a threaded bore 413 that engages the threads on the lead screw 126. In one contemplated embodiment (FIGS. 25-27), instead of the guide slots being in the support bracket 306, the guide slots 414 can be located in the first portion 404 and the second portion 406 and can be engaged by guide pins 416 coupled to the support bracket 306. In one contemplated embodiment (also seen in FIGS. 25-27), the first portion 404 and the second portion 406 are keyed to help prevent angular misalignment when the portions engage one another. The keying feature includes oblique surfaces 417, 419 seen best in FIG. 27A (with one surface 417 also being evident in FIG. 27) on first and second portions 404, 406. If the first and second portions are not square to each other when they are separated as in FIG. 27, then as the first and second portions approach each other to re-engage the leadscrew, the oblique surfaces 417, 419 correct any angular misalignment between the first and second portions as those portions come together.

Figure 29:
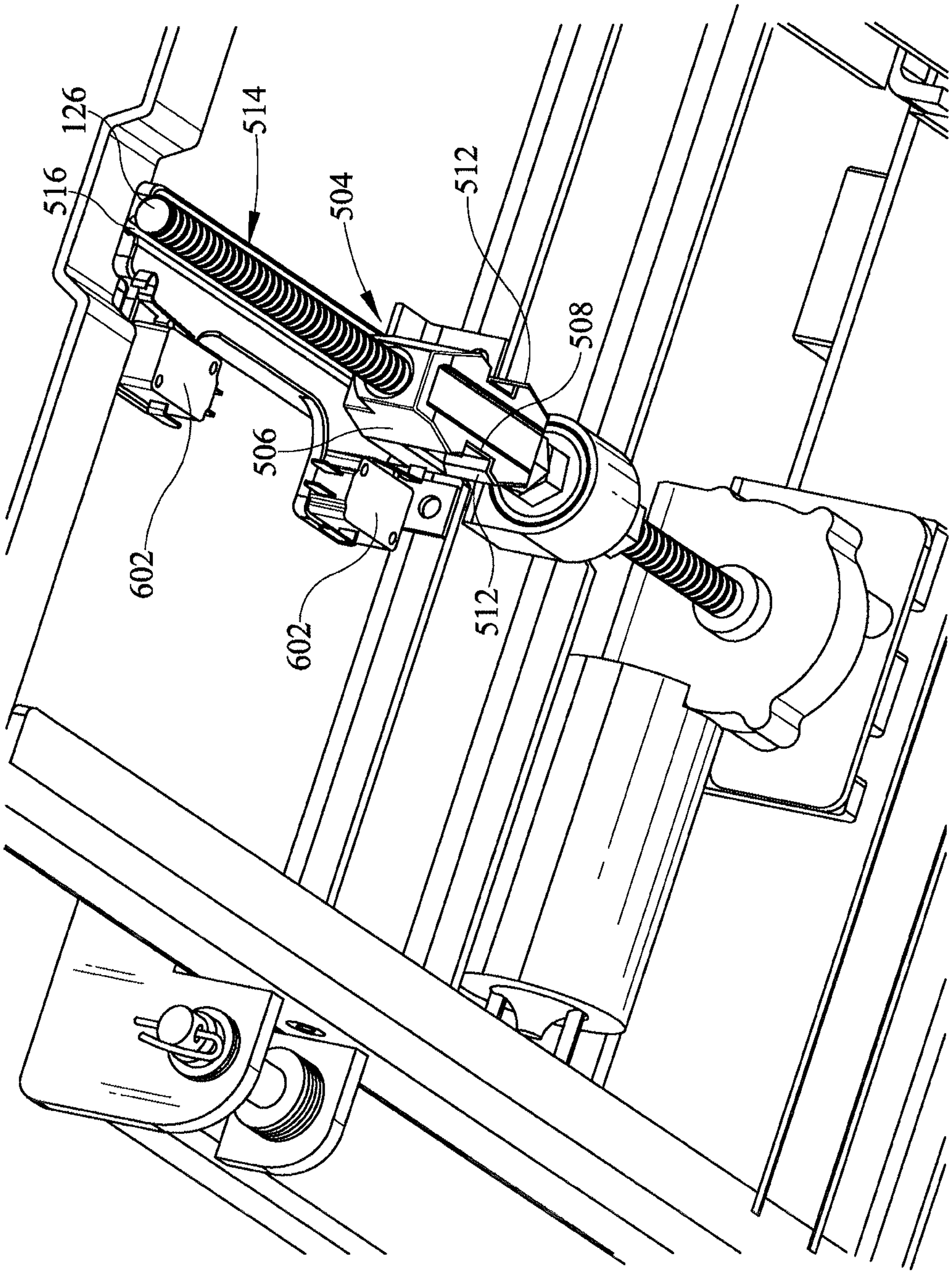
Figure 30:
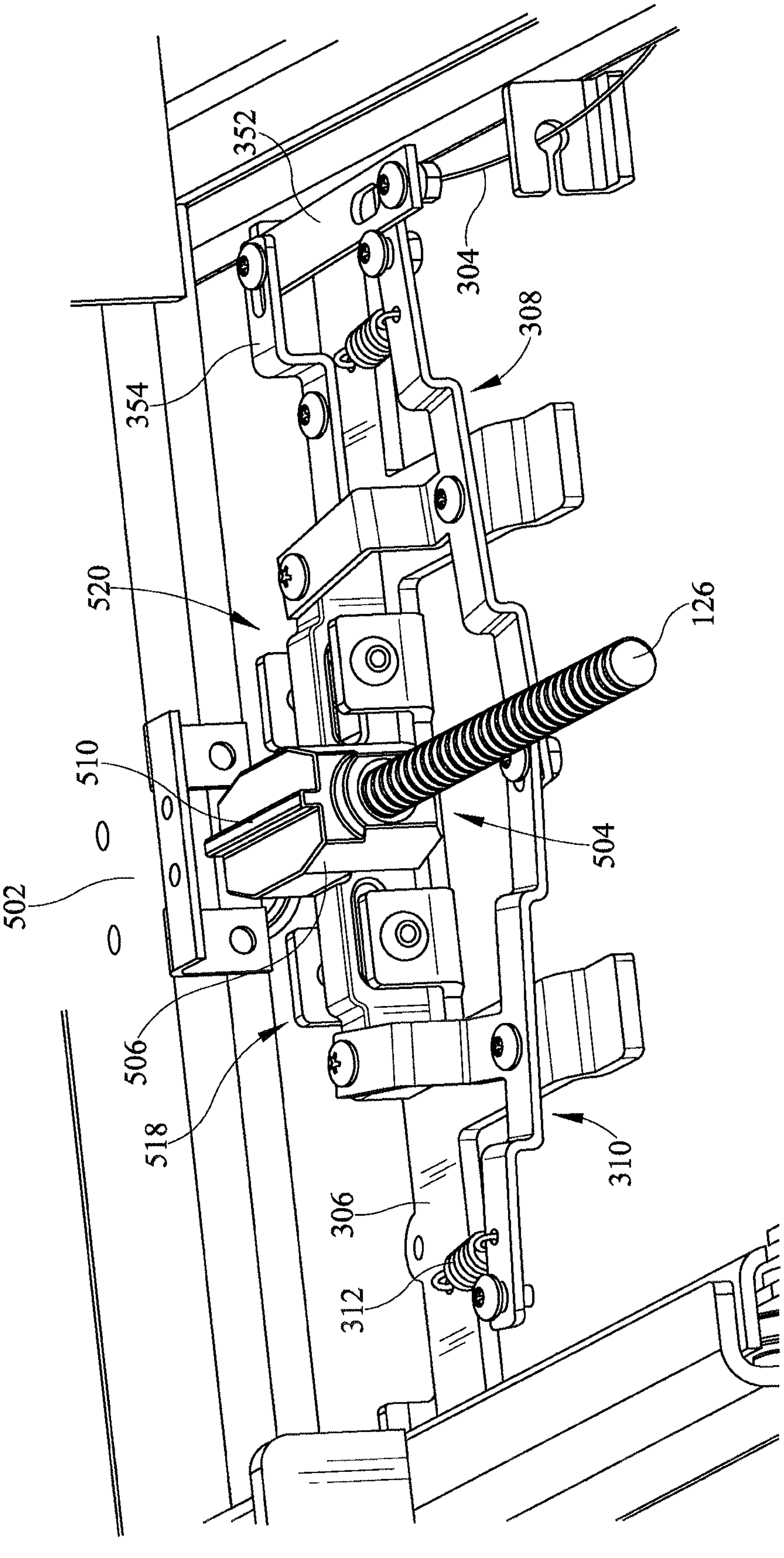
Figure 31:
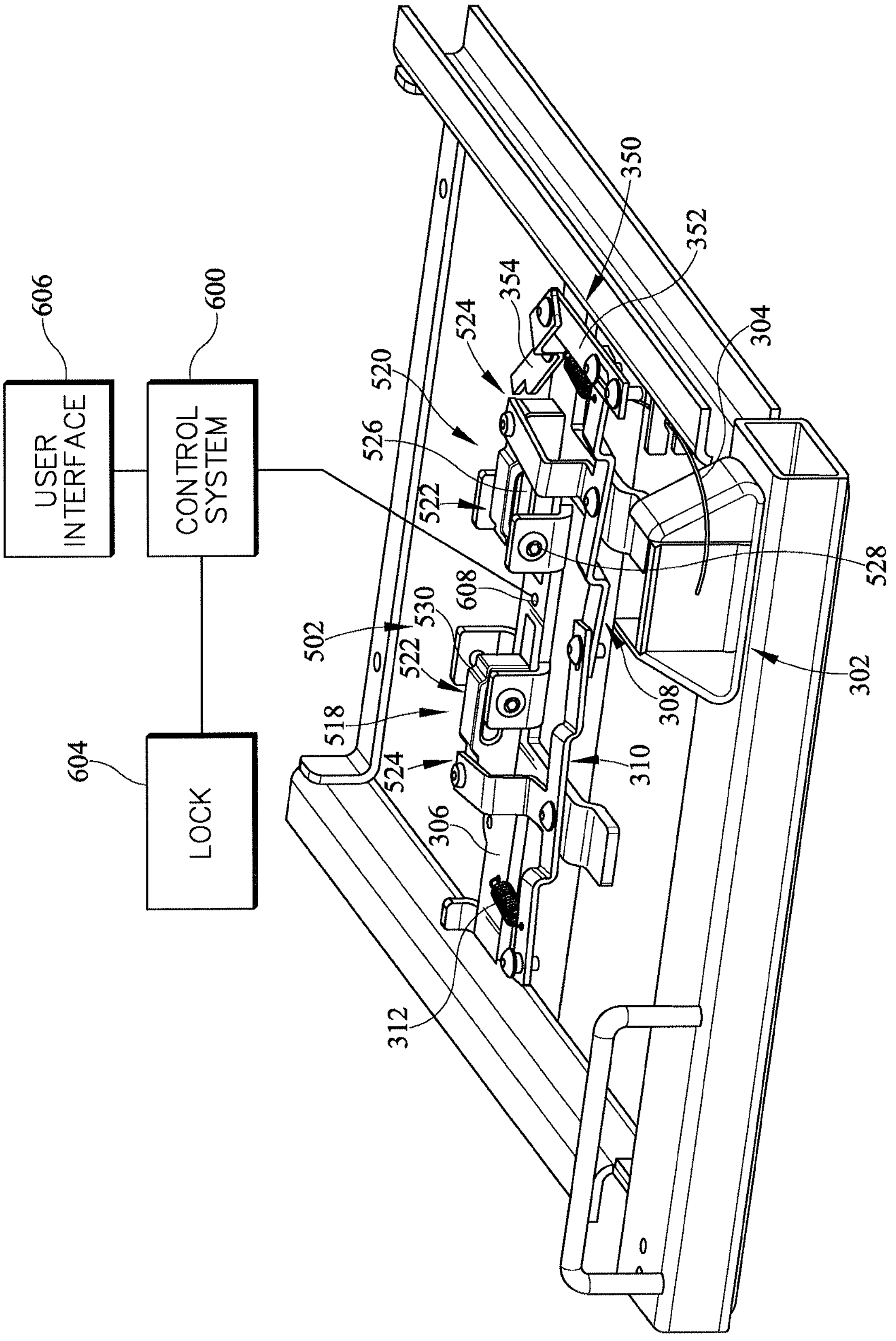
Figure 32:
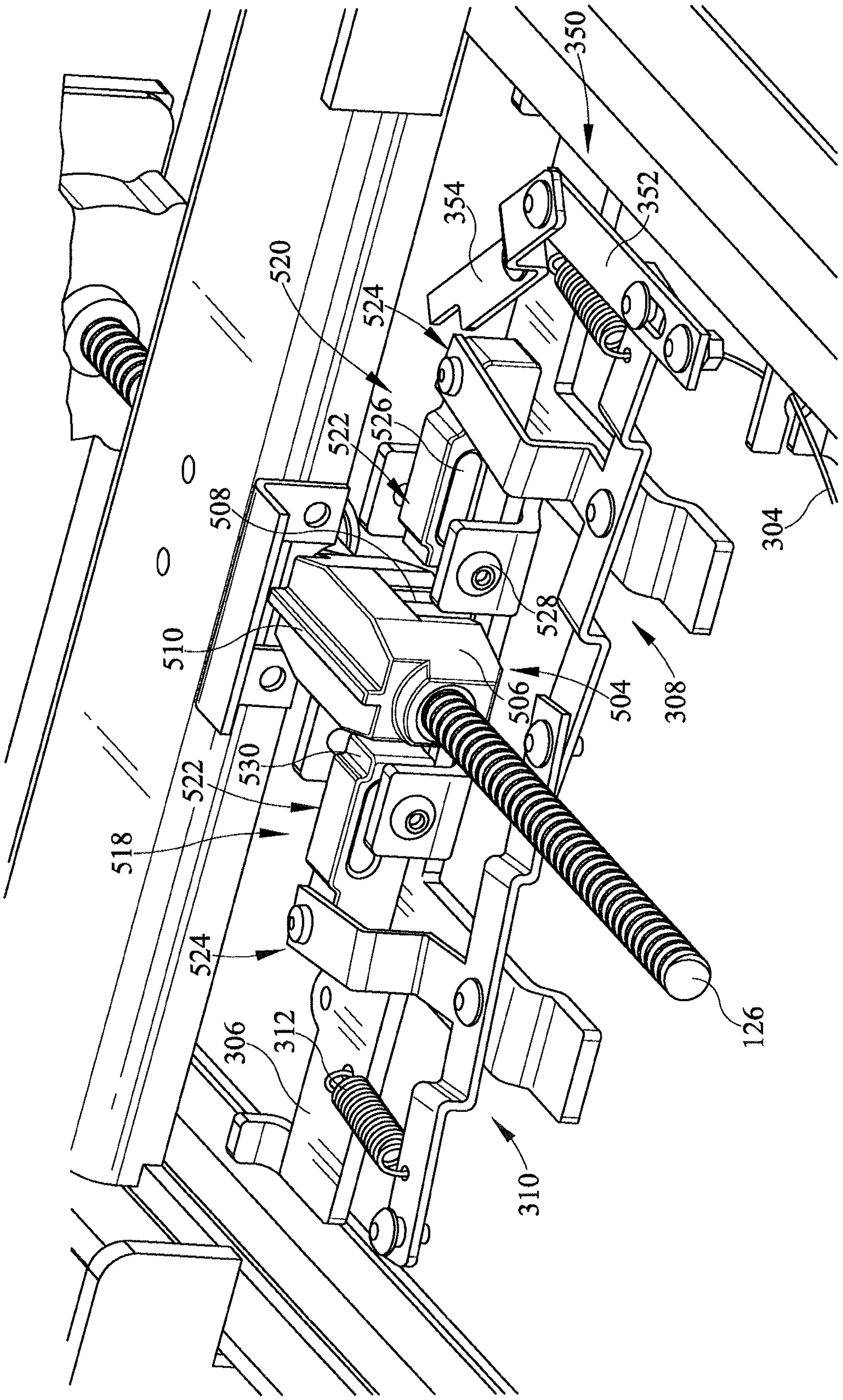

FIGS. 28-33 show a manual release 500 according to another illustrative embodiment of the current disclosure. In this contemplated embodiment, the manual release 500 includes a clasp 502 configured to engage a carrier 504. The carrier 504 includes tapered ends 506, a recessed portion 508 positioned between the tapered ends 506, and a key 510 extending along the top surface of the carrier 504 as shown in FIGS. 30 and 32 In some contemplated embodiments, the carrier 504 includes a second tapered portion 512 (FIG. 29) extending between the tapered ends 506 and the recessed portion 508. The carrier 504 includes internal threads (not shown) that engage the threads on the lead screw 126 and allow the carrier 504 to move along the lead screw 126. The tapered ends 506 are configured to assist the carrier 504 in re-engaging the clasp 502 so that the user can again use the powered width extension. The tapered ends 506 work substantially the same way as the tapered ends 318 of the carriers of FIGS. 19-22. In one contemplated embodiment, the tapered ends 506 engage the clasp 502 and cause the clasp 502 to open and allow the tapered end 506 to pass through so that the carrier 504 can engage the recessed portion 508. The key 510 protrudes from the upper surface of the carrier 504 and is configured to engage a guide track 514 that extends along the length of the lead screw 126. The guide track 514 includes a groove 516 therein that the key 510 rides in. The guide track 514 prevents the key 510 from rotating with the lead screw 126, which causes the carrier 504 to move along the lead screw 126 as it rotates. Maintaining the orientation of the carrier 504 with respect to the elevatable frame 24 allows a user (or a predefined function of the control system 600) to activate the motor to drive the carrier 504 to re-engage the clasp 502 (whether it is retracted or extended). Limit switches 602 (FIG. 29) are coupled to the guide track 514 and are configured to be activated when the carrier 504 reaches the fully extended and the fully retracted positions.

Clasp 502 includes a first portion 518 and a second portion 520, which operate similarly to the first clasp portion and the second clasp portion previously described herein. The first portion 518 and the second portion 520 include a first end 522 and a second end 524. The second pivot arm 310 is coupled to the second end 524 of the first portion 518. The first end 522 includes a guide slot 526 configured to be engaged by a guide pin 528 coupled to the support bracket 306. The first end also includes recessed portion 530 configured to engage the recessed portion 508 of the carrier 504.

In another contemplated embodiment, the hospital bed 20 includes a control system 600 that is configured to receive signals from sensing elements coupled to the manual release. In one contemplated embodiment, the sensing element is a limit switch 602 as shown in FIG. 29. The limit switch 602 is configured to sense when the wing 50 is in its fully retracted or fully extended positions. In another contemplated embodiment, the sensing element includes a potentiometer, a hall-effect sensor, or other sensing devices. In some contemplated embodiments, when the control system 600 receives a signal from the sensing element that the wing 50 is in its fully extended or fully retracted position, the control system 600 can activate a lock 604 configured to maintain the wing 50 in its current position. In one contemplated embodiment, the user presses the width expansion/retraction button on a user interface 606 to release the lock 604. In other contemplated embodiments, the lock 604 can be released by pulling on the manual release handle 302. In some contemplated embodiments, the lock 604 includes a locking gas spring or an electric locking mechanism. In some contemplated embodiments, the user is alerted (with audio and/or visual indicators, such as, lights and/or images on a display) when the wing 50 is not fully extended or retracted. In other contemplated embodiments, the user can be alerted that the wings 50 on the bed are not synchronized, i.e., one is not fully extended, but the others are.

Figure 33:
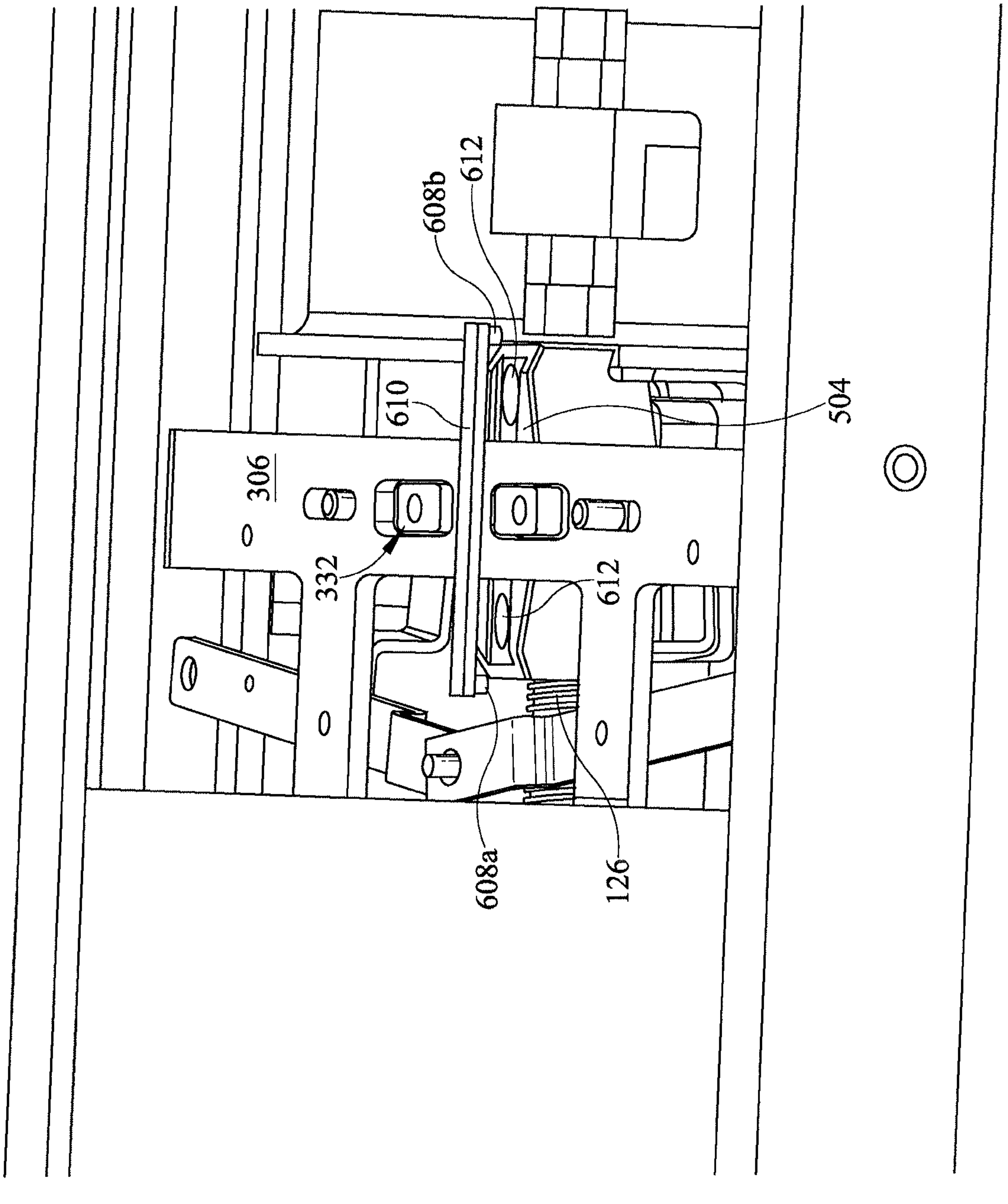
FIG. 33 is perspective views of a manual release according to another illustrative embodiment of the current disclosure.

In one contemplated embodiment, the control system 600 is configured to alert a user visually or audibly when the carrier is engaged by the clasp. In some contemplated embodiments, a hall-effect sensor 608 is coupled to the support bracket 306 and a magnet 612 is recessed into the carrier as shown in FIG. 33. In one contemplated embodiment, one or more hall-effect sensors 608*a*, 608*b* (FIG. 33) can be used to sense when the carrier has passed over the hall-effect sensor 602. If two sensors are used, they can be positioned on the support bracket 306 or on the clasp so that when the carrier is retained by the clasp, the Hall effect sensor is positioned proximate to the magnet in the carrier. In another contemplated embodiment, the hall-effect sensors 608 can be coupled to a separate bracket 610, which may be welded or otherwise secured to bracket 306, and spaced apart from each other a predetermined distance as shown in FIG. 33. When the control system 600 receives two signals from a first sensor 608*a* and no signals from the second sensor 608*b*, the control system 600 determines that the two magnets 612 in the carrier have passed over the first sensor and the carrier should be engaged by the clasp since the second sensor did not indicate that the carrier had passed over it. In another contemplated embodiment, a pressure sensor (not shown) is coupled to the first end of the clasp portions to determine when the carrier is engaged by the clasp.

Figure 34:
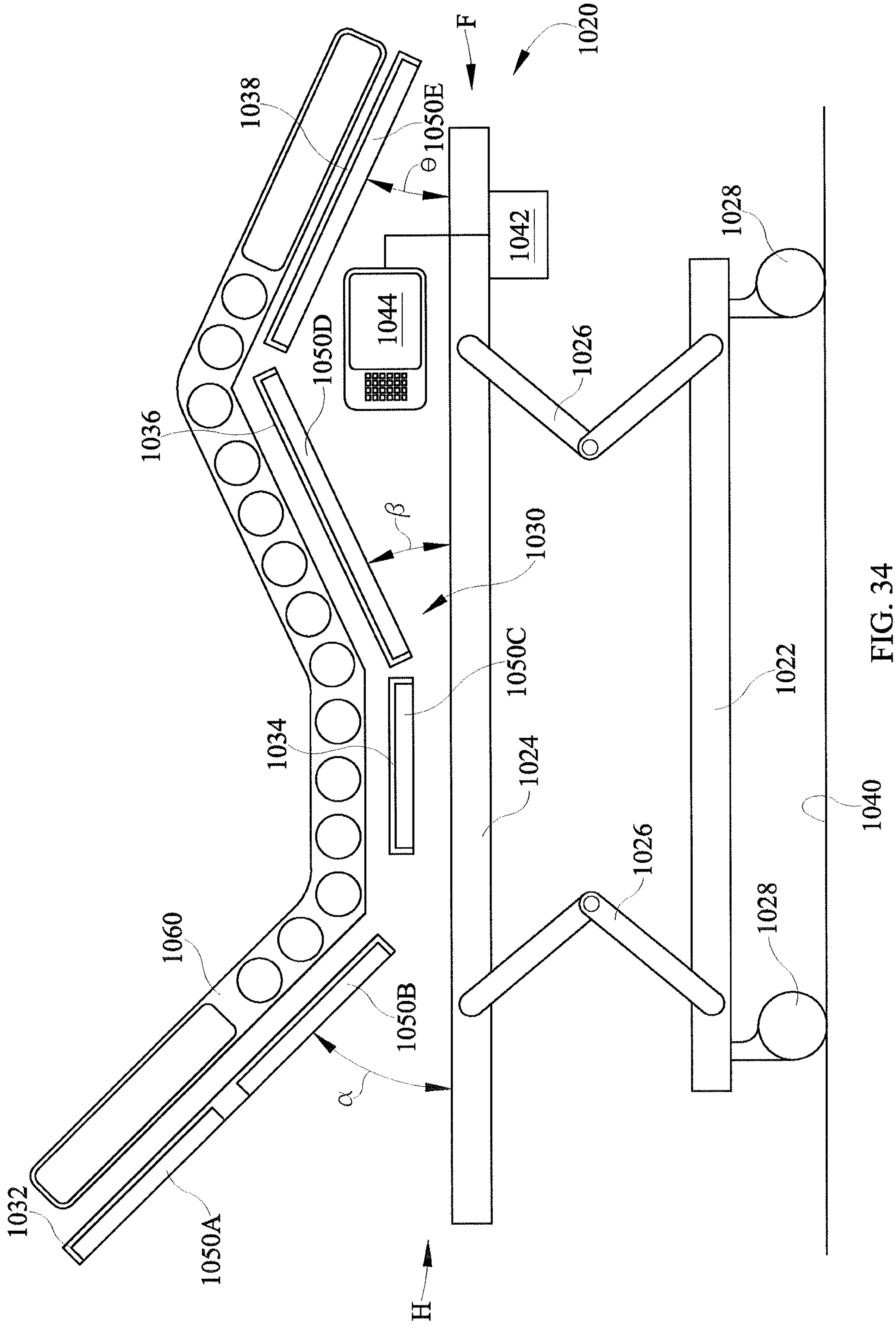
FIG. 34 is a schematic side elevation view of selected components a hospital bed.
Figure 35:
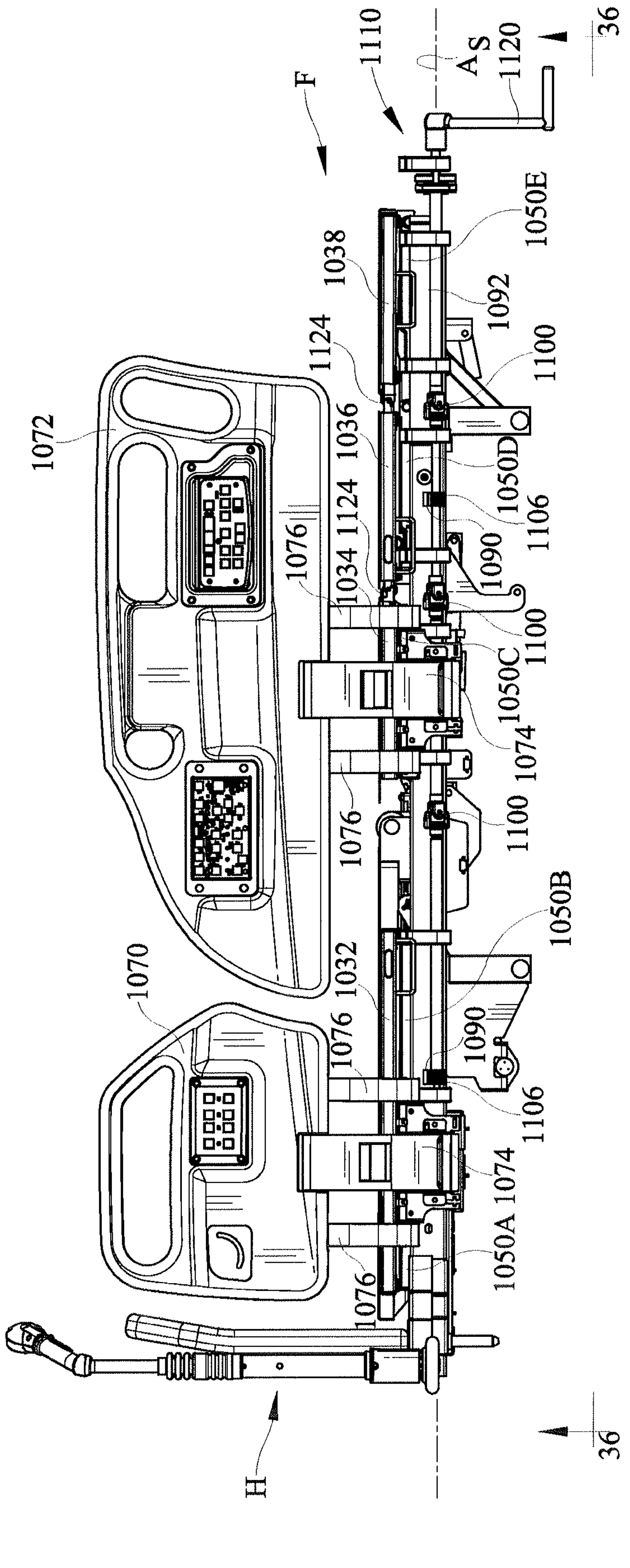
FIG. 35 is a more realistic right side elevation view of a hospital bed frame, a deck section including width expansion wings, and a rack and pinion mechanism for extending and retracting the wings.

Referring to FIG. 34 a hospital bed 1020 includes a base frame 1022 and an elevatable frame 1024. A lift system represented by links 1026 renders the elevatable frame vertically moveable relative to the base frame. The bed extends longitudinally from a head end H to a foot end F and laterally from a right side R (seen in the plane of the illustration) to a left side L seen in the more realistic depictions of FIGS. 35-37. Casters 1028 extend from the base frame to floor 1040. The elevatable frame 1024 includes a deck 1030 comprising longitudinally distributed deck segments. The deck segments include an upper body or torso deck segment 1032 corresponding approximately to an occupant's torso, a seat deck segment 1034 corresponding approximately to an occupant's buttocks, a thigh deck segment 1036 corresponding approximately to an occupant's thighs, and a calf deck segment 1038 corresponding approximately to an occupant's calves. The angular orientations α, β and Θ of the upper body, calf, and thigh deck segments are adjustable. Each deck segment supports a deck panel, not shown in the illustrations, to support a mattress 1048. The bed also includes a controller 1042 for controlling various functions of the bed and a user interface 1044 in communication with the controller.

Referring additionally to FIGS. 35-39, the bed also includes left and right head end siderails 1070, and left and right foot end siderails 1072. Each siderail is connected to a wing 1050 (described in more detail below) by a center link 1074 and a longitudinally split link 1076 such that the siderail 1070 or 1072, wing 1050 and links 1074, 1076 comprise a four bar linkage which enables a user to vertically raise and lower the siderail.

Figure 36:
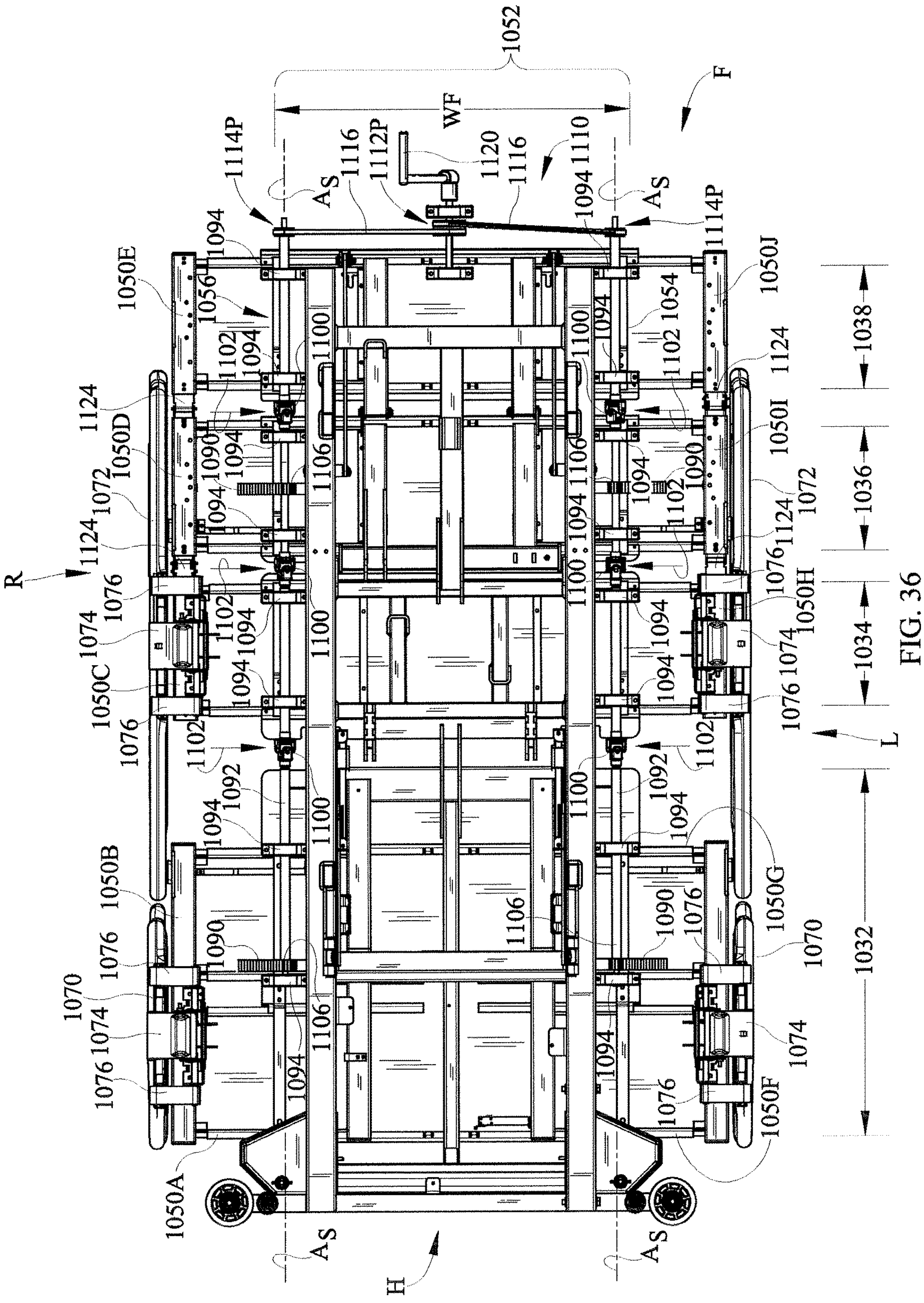
FIG. 36 is a plan view in direction 3-3 of FIG. 35.
Figure 37:
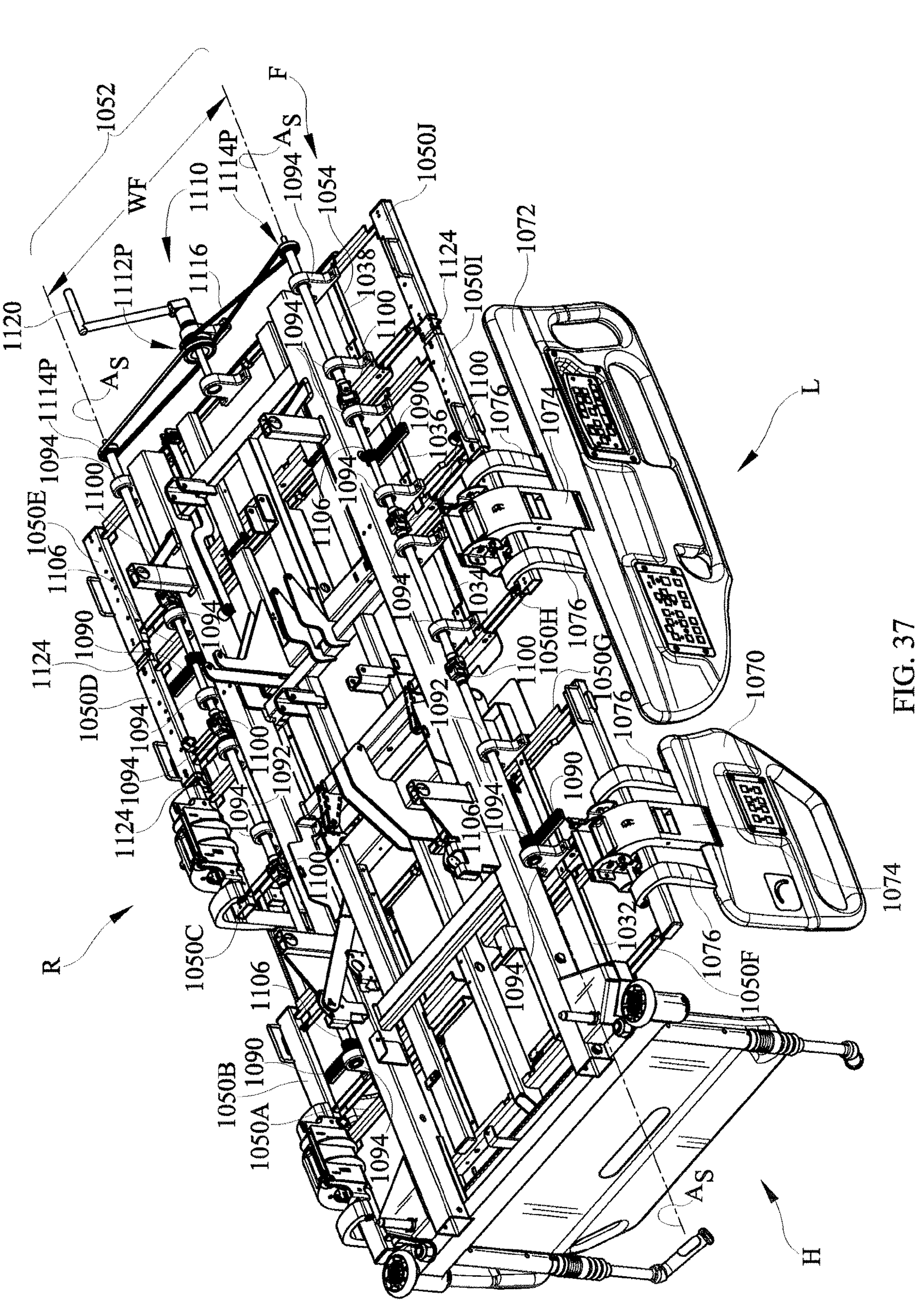
FIG. 37 is a perspective view of the frame, deck section, width expansion wings, and rack and pinion mechanism of FIG. 36 as seen by an observer looking from underneath the frame.
Figure 39:
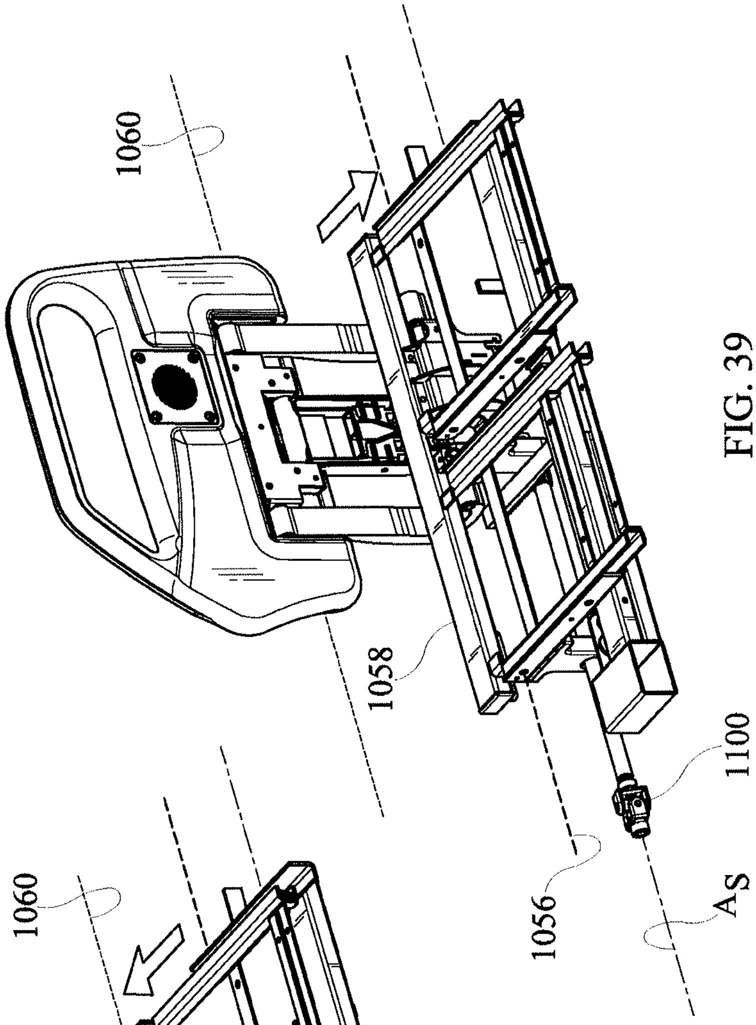
FIGS. 38 and 39 are perspective views of a portion of a representative deck segment showing a deck expansion wing in an extended or deployed position (FIG. 38) and a retracted or stored position (FIG. 39) and also including reference lines to indicate the location of the outboard edge of a fixed width portion of the segment and the location of the outboard edge of the wing.
Figure 38:
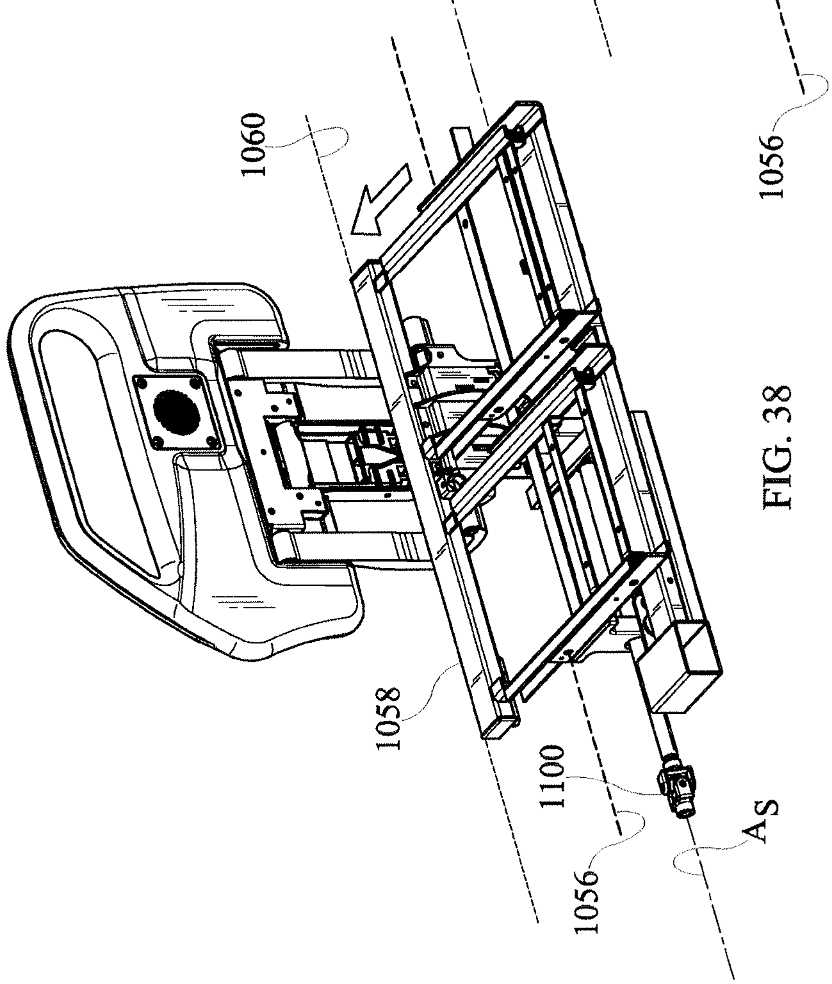
Figure 40:
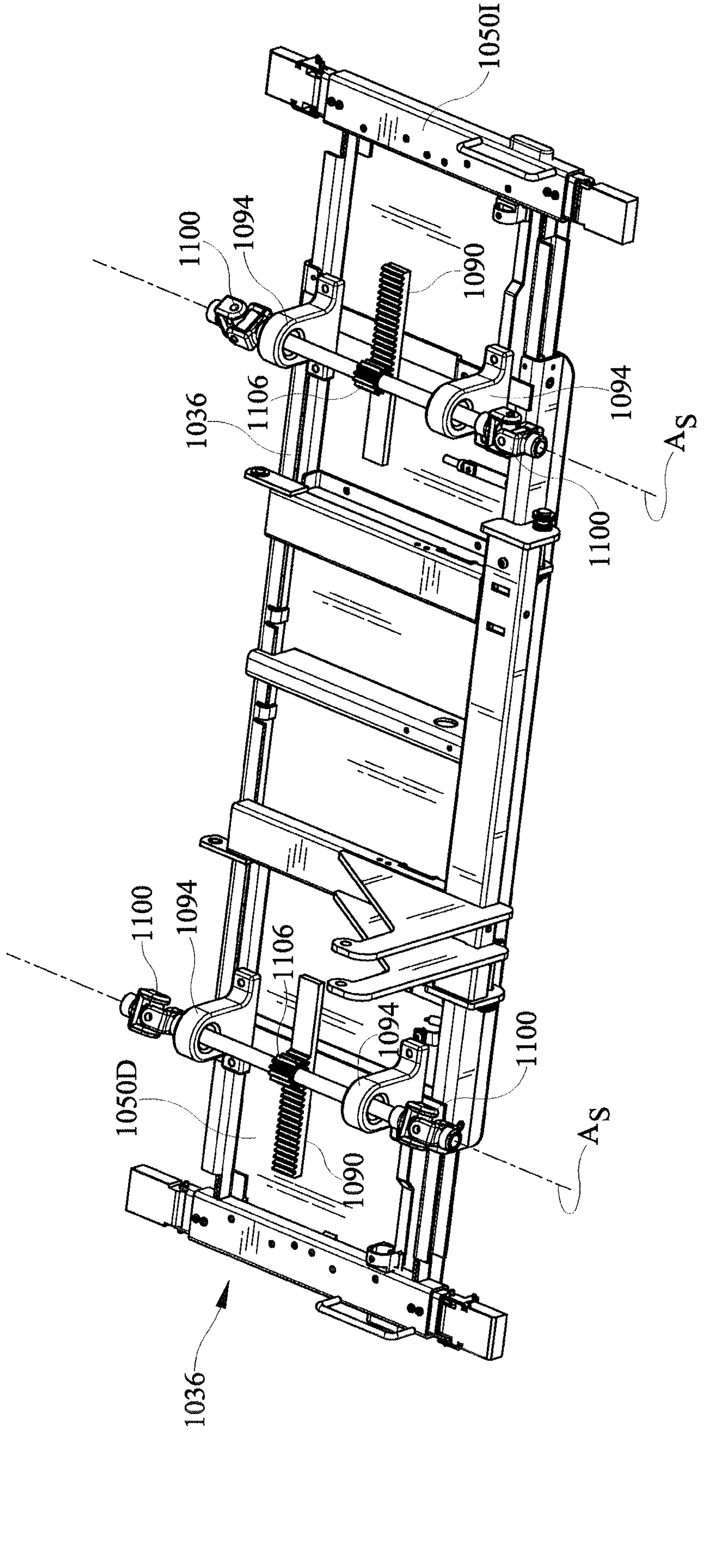
FIG. 40 is a perspective view of a representative deck segment and a pair of expansion wings as seen from underneath the segment.

Deck 1030 comprises a fixed width center section 1052 and one or more wings 1050. Each wing is moveably coupled to one of deck segments 1032, 1034, 1036, 1038 so that the deck segments, and therefore the deck as a whole, are width adjustable. In particular, the wings are laterally moveable between an extended or deployed position (e.g. FIGS. 35-38) and a retracted or stored position (FIG. 39). The fixed width center section 1052 has a width WF measured between its left and right laterally outboard edges 1054, 1056. In the illustrated embodiment all four segments 1032, 1034, 1036, 1038 are width adjustable segments with both left and right wings. Alternatively, one or more wings could be coupled to only one side (left or right) of the bed. The illustrated bed has ten wings. Wings 1050C, 1050H are moveably coupled to seat section 1034. Wings 1050D, 1050I are moveably coupled to thigh section 1036. Wings 1050E, 1050J are moveably coupled to calf section 1038. Wings 1050A, 1050B, 1050F, 1050G are moveably coupled to upper body section 1032. Referring additionally to FIG. 40 wings 1050B, 1050G, 1050D, 1050I include a gear rack 1090 and are referred to as master wings. The remaining six wings are slave wings. 100701 The bed also includes a pair of drive shafts 1092 mounted to the bed frame by way of mounting brackets 1094 such as the pedestal bearings seen in the illustrations so that the shaft is rotatable about shaft axis As. As seen most clearly in FIG. 43 each shaft is made of four shaft segments designated 1092*a* through 1092*d* connected together by a flexible joints such as universal joints 1100. As shown in FIG. 36 each shaft is mounted in the pedestal bearings so that the longitudinal location 1102 of each flexible joint 1100 is at or near the neighboring ends of adjacent deck segments thereby accommodating changes in the relative angular orientations α, β, Θ of adjacent deck segments.

Each shaft also includes one or more pinions 1106 co-rotatable with the drive shaft. Each pinion is engaged with a corresponding rack 1090. The pinions may be formed integrally with the shaft segment or may be distinct from the shaft but co-rotatably mounted thereon.

The bed also includes a drive system 1110 for rotating the drive shaft. The drive system comprises a drive element 1112 such as drive pulley or pulleys 1112P secured to the bed frame, a driven element 1114 such as driven pulley or pulleys 1114P connected to drive shaft 1092, and a connecting element such as belt 1116 engaged with the drive element and each driven element for conveying rotation of the drive element to the driven elements. As seen best in FIG. 37 the belt on one side of the bed may be twisted to reverse the rotational sense of the driven pulley 1114P relative to the drive pulley 1112P. Other arrangements such as gear trains and sprocket/chain arrangements may also be used.

The drive system also includes a manually operable crank 1120 connected to the drive element. In an alternative embodiment seen in FIG. 41 the drive system includes an electric motor 1122 connected to the drive element. Operation of the drive system (e.g. by manually turning the crank or operating the motor) causes the rotary motion of the crank or motor to be conveyed to the driven elements (e.g. driven pulleys 1114P). Rotation of the driven elements rotates drive shafts 1092 and their pinions 1106 which, due to their engagement with racks 1090, moves the wing to which the racks are attached between a deployed position (e.g. FIGS. 35-38) in which a lateral extremity 1058 of the wing is in a position 1060 outboard of the outboard edge 1054 or 1056 of the corresponding (left or right) fixed width deck section and a stored position (FIG. 39) in which the lateral extremity of the wing is in a position inboard of its deployed position. When the wing is in its stored position the lateral extremity thereof may be outboard of outboard edge 1054 or 1056 of fixed width section 1052, substantially aligned with the outboard edge, or inboard of the outboard edge.

The specific embodiment of FIGS. 35-41 includes master wings 1050B, 1050G, 1050D, 1050I, each of which includes a rack 1090, and slave wings 1050A, 1050C, 1050E, 1050F, 1050H, 1050J, each of which do not include a rack. The slave wings, like the master wings, are moveably coupled to the fixed width deck section. However unlike the master wings the slave wings are not directly driven by a pinion 1106 but instead are connected to the master wing such that translation of the master wing by way of its rack and engaged pinion causes translation of the slave wing. In architectures in which a master wing and the slave wing to which it is connected are moveably coupled to different deck segments whose relative angular orientation is nonconstant (e.g. deck sections 1034, 1036 and wings 1050C, 1050D) the wings are connected to each other by a joint 1124 that accommodates changes in the relative angular orientation of the deck segments. Master and slave wings coupled to the same deck segment, or to segments whose relative angular orientation is constant, can be connected together by a connector other than a joint.

In another architecture all the wings include racks 1090 engaged with pinions 1106 that are rotatable by a shaft 1092 in which case shaft 1092 is a common drive shaft for rotating all the pinions.

Figure 41:
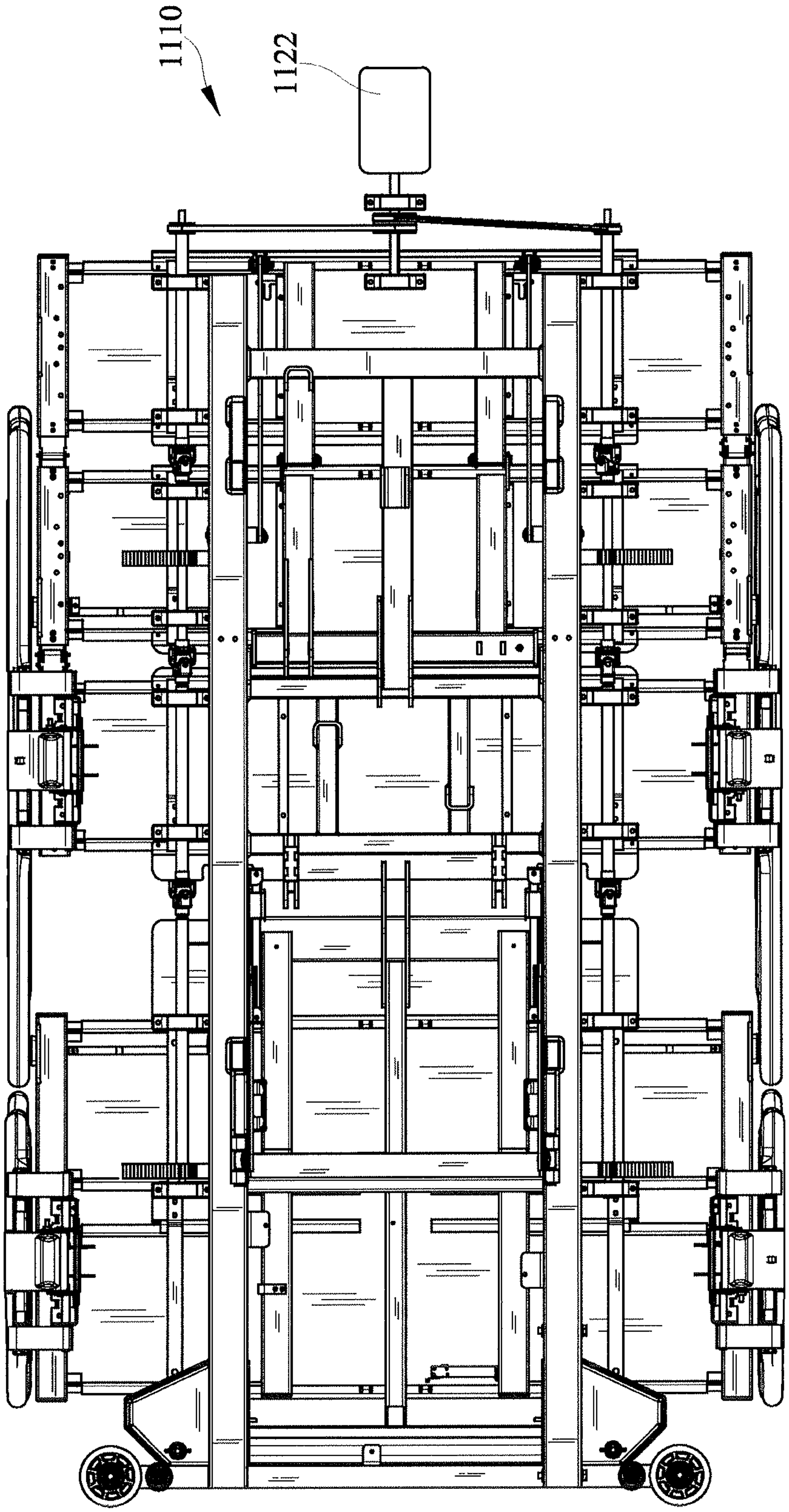
FIG. 41 is a plan view similar to FIG. 36 showing a motor used to effect extension and retraction of the expansion wings.
Figures 42A, 42B, 42C, 42D, 42E, 42F, 42G:
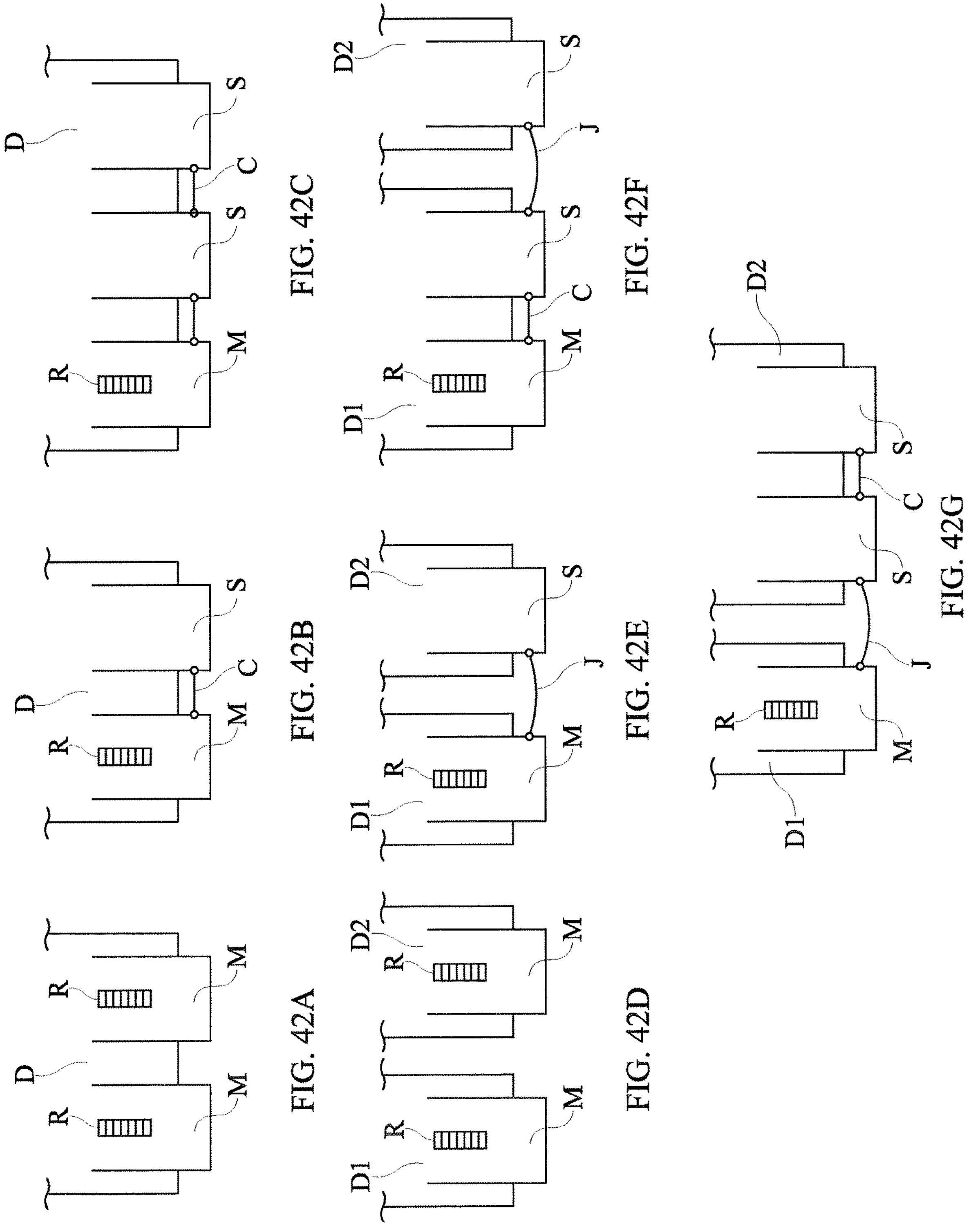
FIGS. 42A-42H are schematic plan views showing a noncomprehensive set of options for arranging master and slave wings on one or more deck segments.
Figure 42H:
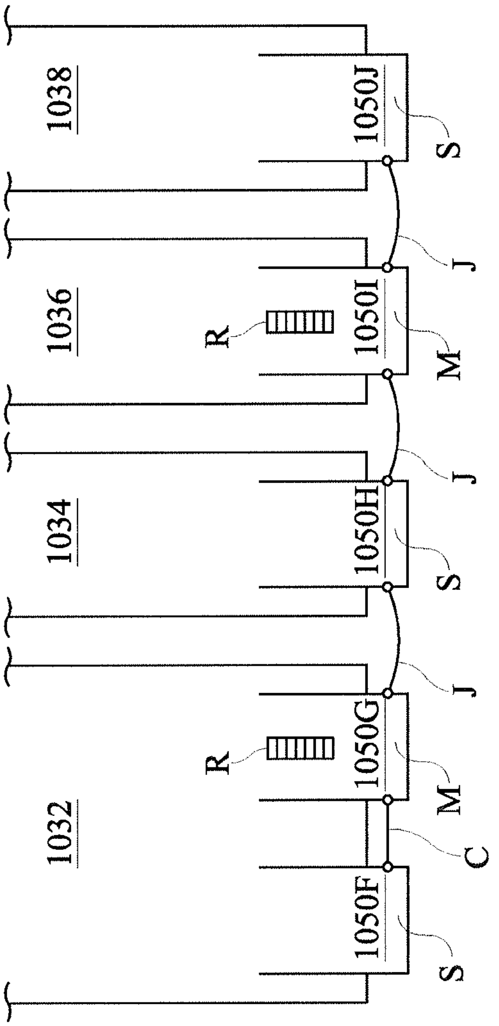

FIGS. 42A through 42H are schematic plan views showing a noncomprehensive set of options for arranging master and slave wings on one or more deck segments. In these illustrations deck sections are designated by D, D1 or D2, master wings by M, slave wings by S, joints by J, nonarticulating (non-joint) connectors by C and gear racks by R. FIG. 42H is a schematic of the specific architecture of FIGS. 35-41.

Figure 43:
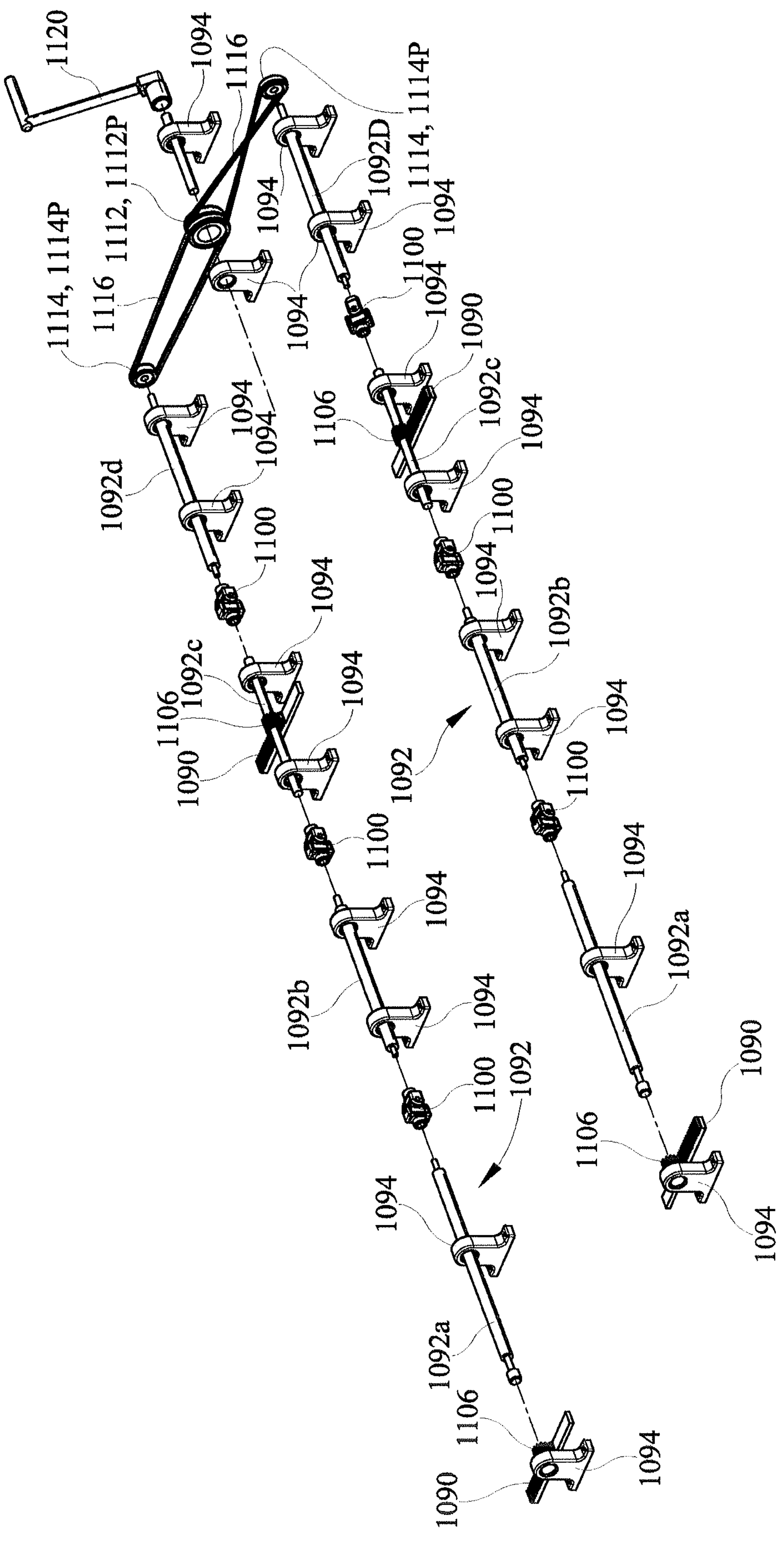
FIG. 43 is an exploded perspective view showing components of a retrofit kit arranged substantially as they would be arranged on a bed as seen from above.

The foregoing explanation and accompanying illustrations are directed to beds manufactured with the width adjustment wings and associated hardware for extending and retracting the wings. However a retrofit kit may be provided for upgrading beds having width expansion wings that must be manually and individually deployed and stored. As seen in FIG. 43, the retrofit kit for upgrading a bed includes a rack 1090 affixable to a deck expansion wing, a drive shaft 1092, mounting hardware such as pedestal brackets 1094 for rotatably mounting the drive shaft to a bed frame, and components of a drive system which is engageable with the drive shaft and securable to the bed frame. The drive shaft itself may include pinions 1106 engageable with a rack when the rack is affixed to the wing and the drive shaft is mounted on the bed frame. Alternatively the kit may include pinions 1106 which are mountable on the drive shaft such that the pinion is engageable with the rack when the rack is affixed to the wing and the drive shaft is mounted on the bed frame.

The drive shaft 1092 may be an assembly comprising at least two sections connected together by a flexible joint 1100 such as universal joints so that when the shaft is mounted on the bed frame each flexible joint will be located to accommodate changes in angular orientation of adjacent deck segments of the bed (e.g. at locations 1102 of FIG. 36). Alternatively the kit may include at least two individual shaft sections such as sections 1092*a* through 1092*d* and flexible joints 1100 (one for each pair of shaft sections to be flexibly connected to each other) for connecting one of the sections to the other of the sections. Each shaft section has a length such that each flexible joint will be located to accommodate changes in angular orientation of adjacent deck segments of the bed when the hardware is retrofit onto the host bed frame.

The retrofit kit also includes a drive element 1112 rotatably securable to the bed frame, a driven element 1114 securable to the drive shaft so that the driven element and the drive shaft are co-rotatable, means for rotating the driven element in response to rotation of the drive element, and means for rotating the drive element. In one embodiment the drive element and driven element are pulleys 1112P, 1114P and the means for rotating the driven pulley in response to rotation of the drive pulley is a belt 1116 engageable with the pulleys.

The means for rotating the drive element of the kit may be a manually operable crank 1120 or a motor 1122 (FIG. 41).

Although this disclosure refers to specific embodiments, it will be understood by those skilled in the art that various changes in form and detail may be made without departing from the subject matter set forth in the accompanying claims.

The invention claimed is:

1. A bed comprising an articulated bed deck configured to support an occupant, the articulated bed deck including a first deck section and a second deck section, the first deck section being pivotable relative to the second deck section, the first deck section including a first fixed width portion and a first wing movably coupled to the first fixed width portion, the second deck section including a second fixed width portion and a second wing movably coupled to the second fixed width portion, a first pulley situated outside a footprint defined by the articulated bed deck and spaced apart from an end of the articulated bed deck, the first pulley being mounted to the first deck section for rotation about a pulley axis that extends beneath the first deck section, wherein the first pulley pivots with the first deck section relative to the second deck section as the first deck section pivots, and a belt trained about the first pulley, the belt and the first pulley being operable to extend and retract the first and second wings relative to the first and second fixed width portions, respectively, to increase and decrease, respectively, a width of the articulated bed deck, wherein the bed is devoid of any pulleys within the footprint defined by the articulated bed deck.

2. The bed of claim 1, further comprising a second pulley about which the belt is trained and a series of articulated shaft sections that are rotated in response to rotation of the second pulley by the belt, rotation of a first shaft section of the series of shaft sections extending and retracting the first wing, and rotation of a second shaft section of the series of shaft sections extending and retracting the second wing.

3. The bed of claim 2, further comprising a universal joint coupling the first shaft section to the second shaft section.

4. The bed of claim 2, further comprising a first pinion coupled to the first shaft section to rotate therewith, a first rack coupled to the first wing and engaging the first pinion so that rotation of the first pinion extends and retracts the first wing via the first rack, a second pinion coupled to the second shaft section to rotate therewith, and a second rack coupled to the second wing and engaging the second pinion so that rotation of the second pinion extends and retracts the second wing via the second rack.

5. The bed of claim 4, further comprising at least one first bracket supporting the first shaft section for rotation relative to the first fixed width portion and at least one second bracket supporting the second shaft section for rotation relative to the second fixed width portion.

6. The bed of claim 4, further comprising first and second brackets supporting the first shaft section for rotation relative to the first fixed width portion of the first deck section and third and fourth brackets supporting the second shaft section for rotation relative to the second fixed width portion of the second deck section.

7. The bed of claim 6, wherein the first pinion is mounted to first shaft section between the first and second brackets and wherein the second pinion is mounted to the second shaft section between the third and fourth brackets.

8. The bed of claim 2, further comprising a manually operable crank coupled to the first pulley and grippable by a user to rotate the first pulley thereby to move the belt to rotate the second pulley to extend and retract the first and second wings.

9. The bed of claim 2, further comprising a motor coupled to the first pulley and operable to rotate the first pulley thereby to move the belt and rotate the second pulley to extend and retract the first and second wings.

10. The bed of claim 1, wherein the first deck section is pivotable relative to the second deck section about a first axis and wherein the first pulley is rotatable about a second axis that is perpendicular to the first axis.

11. A bed comprising an articulated bed deck configured to support an occupant, the articulated bed deck including a first deck section and a second deck section, the first deck section being pivotable relative to the second deck section, the first deck section including a first fixed width portion and a first pair of wings movably coupled to opposite end regions of the first fixed width portion, the second deck section including a second fixed width portion and a second pair of wings movably coupled to opposite end regions of the second fixed width portion, a first pulley situated outside a footprint defined by the articulated bed deck and spaced apart from an end of the articulated bed deck, the first pulley being mounted to the first deck section for rotation about a pulley axis that extends beneath the first deck section, wherein the first pulley pivots with the first deck section relative to the second deck section as the first deck section pivots, and a pair of belts trained about the first pulley, the pair of belts and the first pulley being operable to extend and retract the first and second pairs of wings relative to the first and second fixed width portions, respectively, to increase and decrease, respectively, a width of the articulated bed deck, wherein the bed is devoid of any pulleys within the footprint defined by the articulated bed deck.

12. The bed of claim 11, further comprising a second pulley about which a first belt of the pair of belts is trained, a third pulley about which a second belt of the pair of belts is trained, a first series of articulated shaft sections that are rotated in response to rotation of the second pulley by the first belt, a second series of articulated shaft sections that are rotated in response to rotation of the third pulley by the second belt, and wherein rotation of the first and second series of shaft sections extends and retracts the first and second pairs of wings relative to the first and second fixed width portions, respectively.

13. The bed of claim 12, further comprising universal joints interconnecting shaft sections of the first and second series of articulated shaft sections.

14. The bed of claim 12, further comprising rack and pinion devices that interconnect the first and second series of articulated shaft sections with the first and second pairs of wings.

15. The bed of claim 14, further comprising a plurality of brackets that support the first and second series of articulated shaft sections for rotation relative to the first and second fixed width portions of the respective first and second deck sections.

16. The bed of claim 14, wherein pinions of the rack and pinion devices are mounted to respective shaft sections of the first and second series of articulated shaft sections in between corresponding pairs of brackets that support the respective shaft sections.

17. The bed of claim 12, further comprising a manually operable crank coupled to the first pulley and grippable by a user to rotate the first pulley thereby to move the pair of belts to rotate the second and third pulleys to extend and retract the first and second pairs of wings.

18. The bed of claim 12, further comprising a motor coupled to the first pulley and operable to rotate the first pulley thereby to move the pair of belts and rotate the second and third pulleys to extend and retract the first and second pairs of wings.

19. The bed of claim 11, wherein the pair of belts include first and second belts that extend from the first pulley in opposite directions.

20. The bed of claim 11, wherein the first deck section is pivotable relative to the second deck section about a first axis and wherein the first pulley is rotatable about a second axis that is perpendicular to the first axis.

* * * * *